(12) United States Patent
Li et al.

(10) Patent No.: US 11,947,187 B2
(45) Date of Patent: Apr. 2, 2024

(54) OPTICAL IMAGING LENS ASSEMBLY

(71) Applicant: ZHEJIANG SUNNY OPTICAL CO., LTD, Ningbo (CN)

(72) Inventors: Yanping Li, Ningbo (CN); Lingbo He, Ningbo (CN); Jianjun Li, Ningbo (CN); Fujian Dai, Ningbo (CN); Liefeng Zhao, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 661 days.

(21) Appl. No.: 17/034,576

(22) Filed: Sep. 28, 2020

(65) Prior Publication Data

US 2021/0173185 A1    Jun. 10, 2021

(30) Foreign Application Priority Data

Dec. 5, 2019  (CN) .......................... 201911230923.5

(51) Int. Cl.
*G02B 9/64* (2006.01)
*G02B 13/00* (2006.01)
*G02B 13/02* (2006.01)
*G02B 27/00* (2006.01)

(52) U.S. Cl.
CPC ........... *G02B 9/64* (2013.01); *G02B 13/0045* (2013.01); *G02B 13/02* (2013.01); *G02B 27/0025* (2013.01)

(58) Field of Classification Search
CPC ...... G02B 13/0045; G02B 9/64; G02B 13/02; G02B 27/0025; G02B 13/0015
See application file for complete search history.

(56) References Cited

U.S. PATENT DOCUMENTS

| | | | |
|---|---|---|---|
| 11,567,298 B2* | 1/2023 | Nitta | G02B 13/0045 |
| 2017/0045714 A1 | 2/2017 | Huang | |
| 2017/0052350 A1* | 2/2017 | Chen | G02B 5/005 |
| 2018/0180856 A1* | 6/2018 | Jung | G02B 13/0045 |
| 2020/0132969 A1* | 4/2020 | Huang | H01L 27/14627 |
| 2020/0209554 A1* | 7/2020 | Ko | G02B 13/0045 |

(Continued)

FOREIGN PATENT DOCUMENTS

| | | |
|---|---|---|
| CN | 104932086 A | 9/2015 |
| CN | 106896473 A | 6/2017 |

(Continued)

OTHER PUBLICATIONS

"He L, CN-107741630-A Translation, Espacenet Patent Translate" (Year: 2018).*

*Primary Examiner* — Darryl J Collins
(74) *Attorney, Agent, or Firm* — HAUPTMAN HAM, LLP

(57) ABSTRACT

The present disclosure discloses an optical imaging lens assembly including, sequentially from an object side to an image side along an optical axis, a first lens, a second lens, a third lens, a fourth lens, a fifth lens, a sixth lens, a seventh lens, and an eighth lens having refractive power. At least one of the first lens to the eighth lens has an aspheric surface. A distance TTL along the optical axis from an object-side surface of the first lens to an imaging plane of the optical imaging lens assembly, a total effective focal length f of the optical imaging lens assembly and half of a diagonal length ImgH of an effective pixel area on the imaging plane of the optical imaging lens assembly satisfy the following conditional expressions: $TTL/f \leq 1.0$, $ImgH \geq 6.0$ mm and $1.0 < TTL/ImgH < 1.5$.

17 Claims, 12 Drawing Sheets

(56) References Cited

U.S. PATENT DOCUMENTS

| | | | | |
|---|---|---|---|---|
| 2021/0018729 A1* | 1/2021 | Li | ............................. | G02B 9/64 |
| 2021/0055520 A1* | 2/2021 | Yan | .................... | G02B 13/0045 |
| 2021/0149158 A1* | 5/2021 | Hsueh | ....................... | G02B 9/64 |
| 2021/0157097 A1* | 5/2021 | Hirano | .................... | G02B 13/18 |
| 2021/0364754 A1* | 11/2021 | You | ........................ | G02B 13/18 |
| 2022/0229275 A1* | 7/2022 | Wenren | .................. | G02B 13/02 |

FOREIGN PATENT DOCUMENTS

| | | | | | |
|---|---|---|---|---|---|
| CN | 107741630 | A | | 2/2018 | |
| CN | 107741630 | A | * | 2/2018 | ............. G02B 13/00 |
| CN | 207164344 | U | | 3/2018 | |
| CN | 108254856 | A | | 7/2018 | |
| CN | 108717227 | A | | 10/2018 | |
| CN | 109116520 | A | | 1/2019 | |
| CN | 109375346 | A | | 2/2019 | |
| CN | 109375349 | A | | 2/2019 | |
| CN | 109407267 | A | | 3/2019 | |
| CN | 109490995 | A | | 3/2019 | |
| CN | 110068915 | A | | 7/2019 | |
| CN | 110456476 | A | | 11/2019 | |
| CN | 110456490 | A | | 11/2019 | |
| CN | 110531503 | A | | 12/2019 | |
| CN | 211293428 | U | | 8/2020 | |
| CN | 113759526 | A | * | 12/2021 | ......... G02B 13/0045 |
| JP | 2003337282 | A | | 11/2003 | |

* cited by examiner

OPTICAL IMAGING LENS ASSEMBLY

CROSS-REFERENCE TO RELATED APPLICATION

This application claims benefit of priority to Chinese Patent Application No. 201911230923.5 filed on Dec. 5, 2019 before the China National Intellectual Property Administration, the entire disclosure of which is incorporated herein by reference in its entity.

TECHNICAL FIELD

The present disclosure relates to the field of optical elements, and specifically, relates to an optical imaging lens assembly.

BACKGROUND

The camera phone with a rear camera of 110,000 pixels was proposed in 2000, and the camera phone with autofocus function was appeared in 2005. In the following decades, the performance of the camera of portable electronic products, such as mobile phones, has been rapidly improved with the development of the portable electronic products. In particular, there are 8 million pixels in one cameral in 2010, which but was rapidly up to 64 million pixels in 2019. Moreover, the single-shot lens assembly used in a few years ago has been replaced by a multi-shot combination lens assembly now days. The portable electronic products, such as mobile phones, have had new cameras with the developed functions over a period of time, each of which may bring more surprising functions to people.

As a member of the current multi-camera imaging lens assembly, the telephoto lens assembly has unique features: 1) it may zoom in on the object to make the picture concise and remove unwanted contents of the picture; 2) it may shorten f the distance between the remote scenes and the near scenes, and make the remote scenes before and after the camera produce a compact picture effect, thereby achieving the effect of compressing the space; 3) it may achieve background blur. Such a telephoto lens has obviously become a necessary tool for people who like to shoot people, wild animals, and moon.

With the continuous development of the portable electronic products, people have also put forward higher requirements for the performance of the optical imaging lens assemblies of portable electronic products. The optical imaging assembly is assembled by a plurality of lenses, which offers more design freedoms and thus provides greater possibilities for improving the performance of the portable electronic products.

SUMMARY

The present disclosure provides an optical imaging lens assembly which includes, sequentially from an object side to an image side along an optical axis, a first lens, a second lens, a third lens, a fourth lens, a fifth lens, a sixth lens, a seventh lens, and an eighth lens, wherein each of the first lens to eighth lens has refractive power.

In one embodiment, at least one of the first lens to the eighth lens has an aspheric surface.

In one embodiment, a distance TTL along the optical axis from an object-side surface of the first lens to an imaging plane of the optical imaging lens assembly and a total effective focal length f of the optical imaging lens assembly may satisfy: $TTL/f \leq 1.0$.

In one embodiment, half of a diagonal length ImgH of an effective pixel area on an imaging plane of the optical imaging lens assembly may satisfy: $ImgH \geq 6.0$ mm.

In one embodiment, a distance TTL along the optical axis from an object-side surface of the first lens to an imaging plane of the optical imaging lens assembly and half of a diagonal length ImgH of an effective pixel area on the imaging plane of the optical imaging lens assembly may satisfy: $1.0 < TTL/ImgH < 1.5$.

In one embodiment, an effective focal length f2 of the second lens, an effective focal length f6 of the sixth lens and an effective focal length f8 of the eighth lens may satisfy: $-4.0 < f6/(f2+f8) < -2.5$.

In one embodiment, a total effective focal length f of the optical imaging lens assembly and an effective focal length f1 of the first lens may satisfy: $1.0 < f/f1 < 2.0$.

In one embodiment, a radius of curvature R1 of an object-side surface of the first lens and a radius of curvature R2 of an image-side surface of the first lens may satisfy: $-2.0 < (R1+R2)/(R1-R2) < -1.0$.

In one embodiment, a radius of curvature R3 of an object-side surface of the second lens and a radius of curvature R4 of an image-side surface of the second lens may satisfy: $2.0 < R3/R4 < 4.5$.

In one embodiment, a radius of curvature R5 of an object-side surface of the third lens, a radius of curvature R6 of an image-side surface of the third lens and a total effective focal length f of the optical imaging lens assembly may satisfy: $1.5 < (R5+R6)/f < 2.5$.

In one embodiment, a spaced interval T34 between the third lens and the fourth lens along the optical axis, a center thickness CT4 of the fourth lens along the optical axis and a spaced interval T45 between the fourth lens and the fifth lens along the optical axis may satisfy: $2.0 < T34/(CT4-T45) < 3.0$.

In one embodiment, a center thickness CT5 of the fifth lens along the optical axis and a spaced interval T56 between the fifth lens and the sixth lens along the optical axis may satisfy: $0 < CT5/T56 < 1.0$.

In one embodiment, a spaced interval T67 between the sixth lens and the seventh lens along the optical axis, a spaced interval T78 between the seventh lens and the eighth lens along the optical axis, a center thickness CT7 of the seventh lens along the optical axis and a center thickness CT8 of the eighth lens along the optical axis may satisfy: $2.0 < (T67+T78)/(CT7+CT8) < 3.5$.

In one embodiment, a spaced interval T12 between the first lens and the second lens along the optical axis, a spaced interval T23 between the second lens and the third lens along the optical axis, a spaced interval T34 between the third lens and the fourth lens along the optical axis, a spaced interval T45 between the fourth lens and the fifth lens along the optical axis and a spaced interval T78 between the seventh lens and the eighth lens along the optical axis may satisfy: $1.0 < T78/(T12+T23+T34+T45) < 2.0$.

Through the above configuration, the optical imaging lens assembly according to the present disclosure may have at least one beneficial effect, such as large aperture, telephoto, ultra-thin, and high image quality.

BRIEF DESCRIPTION OF THE DRAWINGS

Other features, objects, and advantages of the present disclosure will become more apparent by reading the detailed description of the non-limiting examples with reference to the accompanying drawings.

DETAILED DESCRIPTION OF EMBODIMENTS

Figure 1:
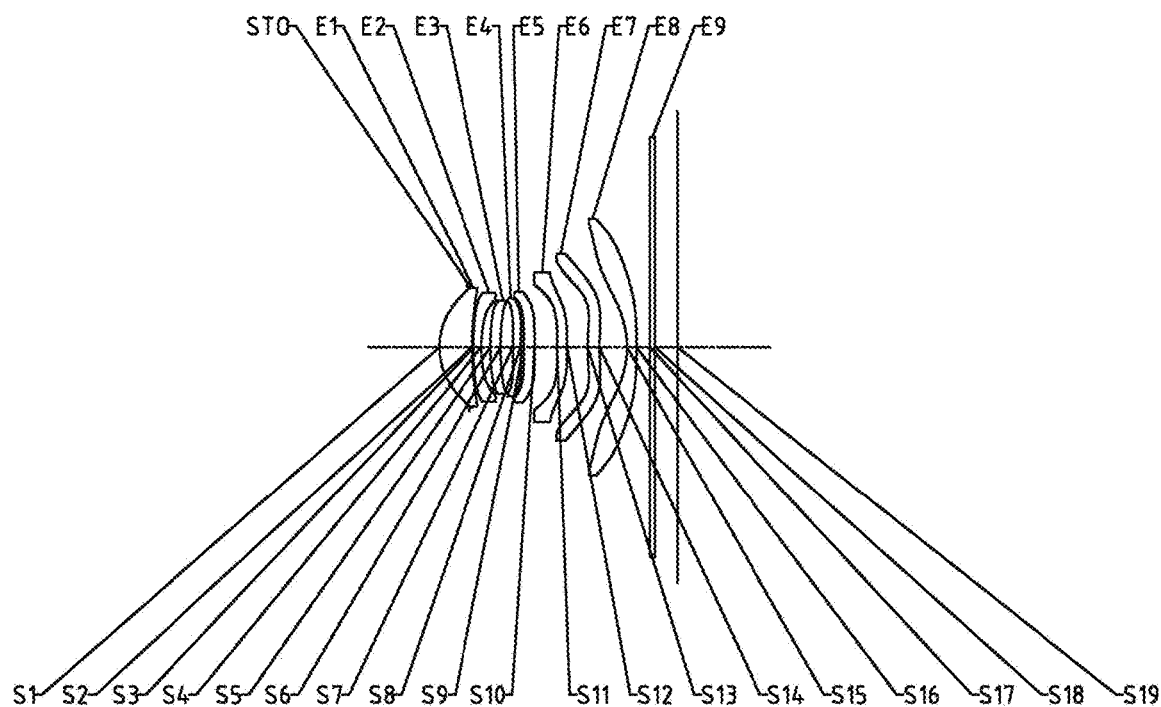
FIG. 1 illustrates a schematic structural view of an optical imaging lens assembly according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include eight lenses having refractive power, which are a first lens, a second lens, a third lens, a fourth lens, a fifth lens, a sixth lens, a seventh lens and an eighth lens. The eight lenses are arranged sequentially from an object side to an image side along an optical axis. At least one of the first lens to the eighth lens has an aspheric surface. Among the first lens to the eighth lens, there may be a spaced interval between each two adjacent lenses.

In an exemplary embodiment, the first lens, the second lens, the third lens, the fourth lens, the fifth lens, the sixth lens, the seventh lens and the eighth lens may all have positive or negative refractive power.

The first lens and the second lens have positive or negative refractive power. The first lens and the second lens can be used in conjunction with each other to increase the viewing angle, reduce the incident angle of the light at the position of the stop, and reduce the aberrations of the optical imaging lens assembly, thereby improving the image quality. The third lens and the fourth lens have positive or negative refractive power. The configuration of the third lens and the fourth lens may be beneficial to reduce the spherical aberration and astigmatic of the lens system. By configuring the fifth lens and the sixth lens to have positive or negative refractive power, it is beneficial to achieve that the optical imaging lens assembly has the characteristics of compact structure, large aperture, and good image quality. Further, it is beneficial to for the optical imaging lens assembly to have good processing characteristics. The seventh lens and the eighth lens have positive or negative refractive power. The cooperation of the seventh lens and the eighth lens can control the spherical aberrations contributed by the two optical lenses to be within a reasonable range, so that good imaging quality can be obtained in the on-axis field of view.

In an exemplary embodiment, the optical imaging lens assembly according to the present disclosure may satisfy: $TTL/f \leq 1.0$, where TTL is a distance along the optical axis from an object-side surface of the first lens to an imaging plane of the optical imaging lens assembly, and f is a total effective focal length of the optical imaging lens assembly. Satisfying $TTL/f \leq 1.0$ may effectively ensure the telephoto characteristics of the optical imaging lens assembly, thereby achieving the effects of zooming in on the object, compressing the space, and blurring the background.

In an exemplary embodiment, the optical imaging lens assembly according to the present disclosure may satisfy: $ImgH \geq 6.0$ mm, where ImgH is half of a diagonal length of an effective pixel area on an imaging plane of the optical imaging lens assembly. Satisfying $ImgH \geq 6.0$ mm may effectively ensure the large image plane of the optical imaging lens assembly, thereby achieving better optical performance of the optical imaging lens assembly.

In an exemplary embodiment, the optical imaging lens assembly according to the present disclosure may satisfy: $1.0 < TTL/ImgH < 1.5$, where TTL is a distance along the optical axis from an object-side surface of the first lens to an imaging plane of the optical imaging lens assembly, and ImgH is half of a diagonal length of an effective pixel area on the imaging plane of the optical imaging lens assembly. More specifically, TTL and ImgH may further satisfy: $1.1 < TTL/ImgH < 1.5$. Satisfying $1.0 < TTL/ImgH < 1.5$ may effectively ensure the ultra-thin characteristics of the optical imaging lens assembly.

In an exemplary embodiment, the optical imaging lens assembly according to the present disclosure may satisfy: $-4.0 < f6/(f2+f8) < -2.5$, where f2 is an effective focal length of the second lens, f6 is an effective focal length of the sixth lens, and f8 is an effective focal length of the eighth lens. More specifically, f6, f2 and f8 may further satisfy: $-3.8 < f6/(f2+f8) < -2.5$. Satisfying $-4.0 < f6/(f2+f8) < -2.5$ may reasonably control the contribution of the above three lenses to the refractive power of the whole lens system. At the same time, the spherical aberration generated by the three lenses may better compensate the negative spherical aberration generated by the first lens.

In an exemplary embodiment, the optical imaging lens assembly according to the present disclosure may satisfy: $1.0 < f/f1 < 2.0$, where f is a total effective focal length of the optical imaging lens assembly, and f1 is an effective focal length of the first lens. More specifically, f and f1 may further satisfy: $1.4 < f/f1 < 1.7$. When $1.0 < f/f1 < 2.0$ is satisfied, the first lens may assume the positive refractive power required by the optical imaging lens assembly, and the spherical aberration generated by the first lens is within a reasonable and controllable range. The subsequent lens can reasonably correct the negative spherical aberration generated by the first lens, thereby ensuring the image quality of the on-axis field of the optical imaging lens assembly.

In an exemplary embodiment, the optical imaging lens assembly according to the present disclosure may satisfy: $-2.0 < (R1+R2)/(R1-R2) < -1.0$, where R1 is a radius of curvature of an object-side surface of the first lens, and R2 is a radius of curvature of an image-side surface of the first lens. More specifically, R1 and R2 may further satisfy: $-1.9 < (R1+R2)/(R1-R2) < -1.4$. Satisfying $-2.0 < (R1+R2)/(R1-R2) < -1.0$ may well control the thickness ratio of the first lens, and may control the coma generated by the first lens within a reasonable range, so that the image quality of the on-axis field and the off-axis field will not be significantly degraded due to the coma.

In an exemplary embodiment, the optical imaging lens assembly according to the present disclosure may satisfy: $2.0 < R3/R4 < 4.5$, where R3 is a radius of curvature of an object-side surface of the second lens, and R4 is a radius of curvature of an image-side surface of the second lens. More specifically, R3 and R4 may further satisfy: $2.0 < R3/R4 < 4.4$. When $2.0 < R3/R4 < 4.5$ is satisfied, the thickness ratio of the second lens may be well controlled, so that the second lens has the characteristics of easy processing.

In an exemplary embodiment, the optical imaging lens assembly according to the present disclosure may satisfy: $1.5 < (R5+R6)/f < 2.5$, where R5 is a radius of curvature of an object-side surface of the third lens, R6 is a radius of curvature of an image-side surface of the third lens, and f is a total effective focal length of the optical imaging lens assembly. More specifically, R5, R6 and f may further satisfy: $1.7 < (R5+R6)/f < 2.2$. When $1.5 < (R5+R6)/f < 2.5$ is satisfied, the astigmatic of the lens system may be effectively corrected, thereby ensuring the image quality of the edge field-of-view.

In an exemplary embodiment, the optical imaging lens assembly according to the present disclosure may satisfy: $2.0 < T34/(CT4-T45) < 3.0$, where T34 is a spaced interval between the third lens and the fourth lens along the optical axis, CT4 is a center thickness of the fourth lens along the optical axis, and T45 is a spaced interval between the fourth lens and the fifth lens along the optical axis. More specifically, T34, CT4 and T45 may further satisfy: $2.1 < T34/(CT4-T45) < 2.8$. Satisfying $2.0 < T34/(CT4-T45) < 3.0$ may effectively restrict the thickness ratio and the relative position of the third lens, the fourth lens and the fifth lens, so that the third lens, the fourth lens and the fifth lens have uniform thicknesses. The lens assembly has a uniformly arranged structure, which is convenient for molding process and assembly.

In an exemplary embodiment, the optical imaging lens assembly according to the present disclosure may satisfy: $0 < CT5/T56 < 1.0$, where CT5 is a center thickness of the fifth lens along the optical axis, and T56 is a spaced interval between the fifth lens and the sixth lens along the optical axis. More specifically, CT5 and T56 may further satisfy: $0.4 < CT5/T56 < 0.8$. Satisfying $0 < CT5/T56 < 1.0$ may effectively restrict the shape and thickness ratio of the fifth lens. The fifth lens has a uniform thickness, which is convenient for molding and processing.

In an exemplary embodiment, the optical imaging lens assembly according to the present disclosure may satisfy: $2.0 < (T67+T78)/(CT7+CT8) < 3.5$, where T67 is a spaced interval between the sixth lens and the seventh lens along the optical axis, T78 is a spaced interval between the seventh lens and the eighth lens along the optical axis, CT7 is a center thickness of the seventh lens along the optical axis, and CT8 is a center thickness of the eighth lens along the optical axis. More specifically, T67, T78, CT7 and CT8 may further satisfy: $2.1<(T67+T78)/(CT7+CT8)<3.2$. Satisfying $2.0<(T67+T78)/(CT7+CT8)<3.5$ may effectively restrict the shape and thickness ratio of the sixth lens, the seventh lens, and the eighth lens. The sixth lens, the seventh lens, and the eighth lens have uniform thicknesses, which is convenient for molding and processing.

In an exemplary embodiment, the optical imaging lens assembly according to the present disclosure may satisfy: $1.0<T78/(T12+T23+T34+T45)<2.0$, where T12 is a spaced interval between the first lens and the second lens along the optical axis, T23 is a spaced interval between the second lens and the third lens along the optical axis, T34 is a spaced interval between the third lens and the fourth lens along the optical axis, T45 is a spaced interval between the fourth lens and the fifth lens along the optical axis, and T78 is a spaced interval between the seventh lens and the eighth lens along the optical axis. More specifically, T78, T12, T23, T34 and T45 may further satisfy: $1.0<T78/(T12+T23+T34+T45)<1.6$. Satisfying $1.0<T78/(T12+T23+T34+T45)<2.0$ may effectively restrict the relative position of the eighth lens and the front seven lenses and the distance between lenses, effectively guarantee the telephoto characteristics of the optical imaging lens assembly, and reasonably control range of the residual distortion after compensation, so that the optical imaging lens assembly has a good distortion performance.

In an exemplary embodiment, the optical imaging lens assembly according to the present disclosure may further include a stop disposed between the object side and the first lens. Optionally, the above optical imaging lens assembly may further include an optical filter for correcting the color deviation and/or a protective glass for protecting the photosensitive element located on an imaging plane.

The optical imaging lens assembly according to the above embodiments of the present disclosure may employ a plurality of lenses, such as eight lenses as described above. By properly configuring the refractive power, the center thickness of each lens, spaced intervals along the optical axis between the lenses, and the optimal selection of high-order aspheric parameters, etc., the size of the optical imaging lens assembly may be effectively reduced and the workability of the optical imaging lens assembly may be improved, such that the optical imaging lens assembly is more advantageous for production processing and may be applied to portable electronic products. The optical imaging lens assembly configured as described above may have characteristics such as large aperture, telephoto, ultra-thin, and good image quality. In the case of satisfying the telephoto characteristics, the larger the aperture is, the greater the amount of light is, which may effectively increase the shutter speed and achieve a better background blur effect. The eight-piece ultra-thin optical system can ensure the ultra-thinness of the portable electronic products, such as mobile phones, while fully improving the optical performance, Therefore, it can be more adapted to market demand and the market trend of ultra-thin portable electronic products, such as mobile phones.

In the embodiments of the present disclosure, at least one of the surfaces of lenses is aspheric, that is, at least one of the object-side surface of the first lens to the image-side surface of the eighth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens, the seventh lens and the eighth lens is aspheric. Optionally, the object-side surface and the image-side surface of each of the first lens, the second lens, the third lens, the fourth lens, the fifth lens, the sixth lens, the seventh lens and the eighth lens are aspheric.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking eight lenses as an example, the optical imaging lens assembly is not limited to include eight lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2C. FIG. 1 shows a schematic structural view of the optical imaging lens assembly according to example 1 of the present disclosure.

As shown in FIG. 1, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has positive refractive power, an object-side surface S13 thereof is a convex surface, and an image-side surface S14 thereof is a concave surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

Table 1 is a table illustrating basic parameters of the optical imaging lens assembly of example 1, wherein the units for the radius of curvature, the thickness/distance and the focal length are millimeter (mm).

TABLE 1

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −1.3082 | | | | |
| S1 | Aspheric | 3.0182 | 1.4200 | 1.55 | 56.1 | 6.57 | 0.0423 |
| S2 | Aspheric | 15.9114 | 0.0540 | | | | 2.6911 |
| S3 | Aspheric | 17.9170 | 0.3310 | 1.68 | 19.2 | −13.96 | 13.4737 |
| S4 | Aspheric | 6.1452 | 0.3917 | | | | 1.4079 |
| S5 | Aspheric | 10.7975 | 0.4319 | 1.55 | 56.1 | 500.00 | 16.3763 |
| S6 | Aspheric | 11.0834 | 0.5246 | | | | 12.7272 |
| S7 | Aspheric | 27.0411 | 0.3300 | 1.57 | 37.4 | −88.42 | 48.1304 |
| S8 | Aspheric | 17.5492 | 0.1302 | | | | 49.6997 |
| S9 | Aspheric | 30.6838 | 0.4696 | 1.68 | 19.2 | 83.01 | 35.4482 |
| S10 | Aspheric | 67.1011 | 0.9511 | | | | 8.4467 |
| S11 | Aspheric | 76.4143 | 0.4262 | 1.57 | 37.4 | 65.62 | −99.0000 |
| S12 | Aspheric | −73.7919 | 0.8733 | | | | −99.0000 |
| S13 | Aspheric | 8.5876 | 0.5010 | 1.55 | 56.1 | 28.54 | 1.3461 |
| S14 | Aspheric | 18.7412 | 1.1727 | | | | 14.2390 |
| S15 | Aspheric | −4.4301 | 0.4000 | 1.54 | 55.9 | −7.96 | −1.1934 |
| S16 | Aspheric | 124.1378 | 0.5696 | | | | −97.9123 |
| S17 | Spherical | Infinite | 0.2184 | 1.52 | 64.2 | | |
| S18 | Spherical | Infinite | 0.9617 | | | | |
| S19 | Spherical | Infinite | | | | | |

In this example, a total effective focal length f of the optical imaging lens assembly is 10.22 mm, a total length TTL of the optical imaging lens assembly (i.e., a distance along the optical axis from the object-side surface S1 of the first lens E1 to the imaging plane S19 of the optical imaging lens assembly) is 10.16 mm, half of a diagonal length ImgH of an effective pixel area on the imaging plane S19 of the optical imaging lens assembly is 7.93 mm, half of a maximal field-of-view Semi-FOV of the optical imaging lens assembly is 36.8°, and an aperture value Fno of the optical imaging lens assembly is 2.00.

In example 1, the object-side surface and the image-side surface of any one of the first lens E1 to the eighth lens E8 are aspheric. The surface shape x of each aspheric lens may be defined by using, but not limited to, the following aspheric formula:

$$x = \frac{ch^2}{1 + \sqrt{1 - (k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; $A_i$ is a correction coefficient for the i-th order of the aspheric surface. Table 2 below shows high-order coefficients A4, A6, A8, A10, A12, A14, A16, A18 and A20 applicable to each aspheric surface S1 to S16 in example 1.

TABLE 2

| Surface number | A4 | A6 | A8 | A10 | A12 | A14 | A16 | A18 | A20 |
|---|---|---|---|---|---|---|---|---|---|
| S1 | 4.5851E−05 | −2.3940E−04 | 1.0718E−04 | 2.1059E−06 | −2.4747E−05 | 1.0727E−05 | −2.2287E−06 | 2.3669E−07 | −1.0842E−08 |
| S2 | −7.1609E−03 | 8.7354E−03 | −5.3334E−03 | 2.0314E−03 | −4.3079E−04 | 3.8408E−05 | 1.6180E−06 | −5.5936E−07 | 2.9240E−08 |
| S3 | −5.9149E−03 | 1.0199E−02 | −5.7476E−03 | 2.0222E−03 | −3.3646E−04 | −1.0519E−06 | 8.7948E−06 | −1.1437E−06 | 4.5665E−08 |
| S4 | −8.0161E−04 | 7.0357E−03 | −6.1145E−03 | 5.1763E−03 | −2.9542E−03 | 1.1308E−03 | −2.6771E−04 | 3.4983E−05 | −1.9183E−06 |
| S5 | −8.3568E−03 | 2.2012E−03 | 4.5865E−04 | −1.4354E−04 | 7.4976E−05 | −9.4815E−06 | −1.1703E−06 | 7.8642E−08 | 3.4133E−08 |
| S6 | −8.3243E−03 | 1.5411E−03 | 1.2867E−03 | −1.5005E−03 | 1.3461E−03 | −6.9279E−04 | 2.0727E−04 | −3.3568E−05 | 2.2890E−06 |
| S7 | −1.4189E−02 | 1.3846E−03 | −6.7206E−03 | 7.2887E−03 | −4.6742E−03 | 1.9294E−03 | −4.9322E−04 | 7.0424E−05 | −4.3120E−06 |
| S8 | −2.2923E−02 | 1.0518E−02 | −1.2064E−02 | 7.7197E−03 | −3.5437E−03 | 1.2060E−03 | −2.7210E−04 | 3.4536E−05 | −1.8541E−06 |
| S9 | −2.8914E−02 | 1.1669E−02 | −6.6877E−03 | 2.4884E−03 | −8.5224E−04 | 3.1231E−04 | −8.2011E−05 | 1.1144E−05 | −5.8701E−07 |
| S10 | −2.4003E−02 | 6.7075E−03 | −3.4372E−03 | 1.4659E−03 | −5.1853E−04 | 1.3654E−04 | −2.3892E−05 | 2.3545E−06 | −9.5191E−08 |
| S11 | −2.0231E−02 | −1.8305E−03 | 2.2508E−03 | −1.0486E−03 | 2.4225E−04 | −2.7100E−05 | 7.8963E−07 | 9.3664E−08 | −5.7884E−09 |
| S12 | −1.9212E−02 | −1.8536E−03 | 2.5297E−03 | −1.0207E−03 | 2.3317E−04 | −3.1150E−05 | 2.4265E−06 | −1.0289E−07 | 1.8472E−09 |
| S13 | −5.8686E−03 | −9.4358E−03 | 2.7931E−03 | −4.9543E−04 | 5.7144E−05 | −4.0782E−06 | 1.7270E−07 | −4.0203E−09 | 4.0594E−11 |
| S14 | 6.8523E−03 | −1.0919E−02 | 2.9728E−03 | −5.0651E−04 | 5.8223E−05 | −4.3646E−06 | 2.0164E−07 | −5.1817E−09 | 5.6485E−11 |
| S15 | −6.5086E−03 | 1.1080E−03 | −1.5617E−05 | −5.9799E−06 | 5.5865E−07 | −2.4835E−08 | 6.2847E−10 | −8.7141E−12 | 5.1575E−14 |
| S16 | −1.5155E−02 | 2.5231E−03 | −2.5834E−04 | 1.6903E−05 | −7.2945E−07 | 2.0869E−08 | −3.8521E−10 | 4.1739E−12 | −2.0027E−14 |

Figures 2A, 2B:
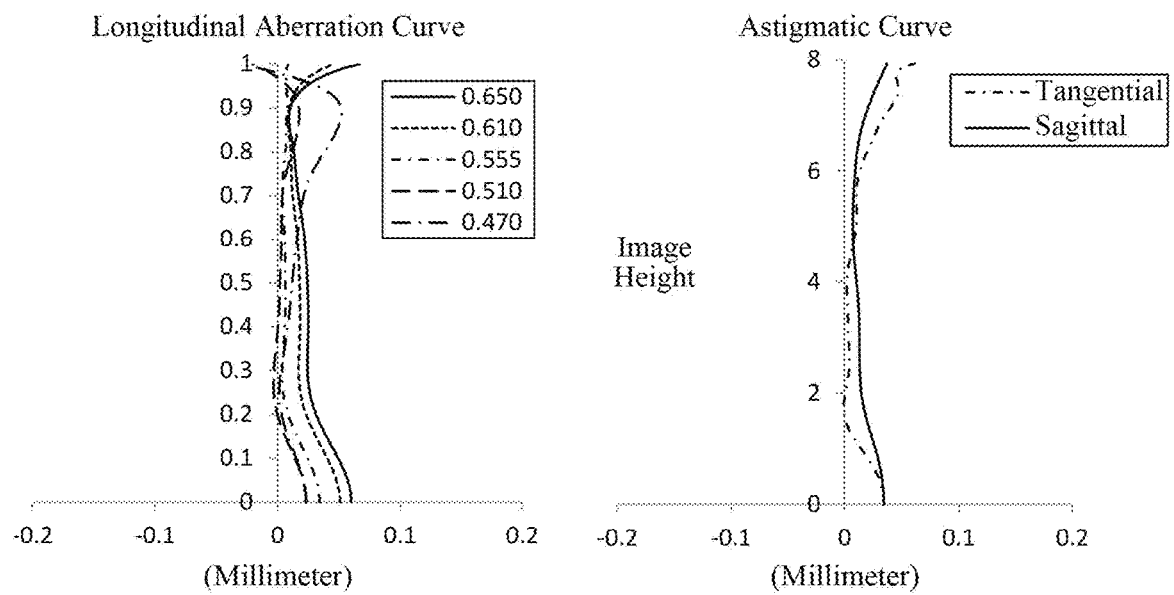
FIGS. 2A to 2C illustrate a longitudinal aberration curve, an astigmatic curve and a distortion curve of the optical imaging lens assembly of the example 1, respectively.
Figure 2C:
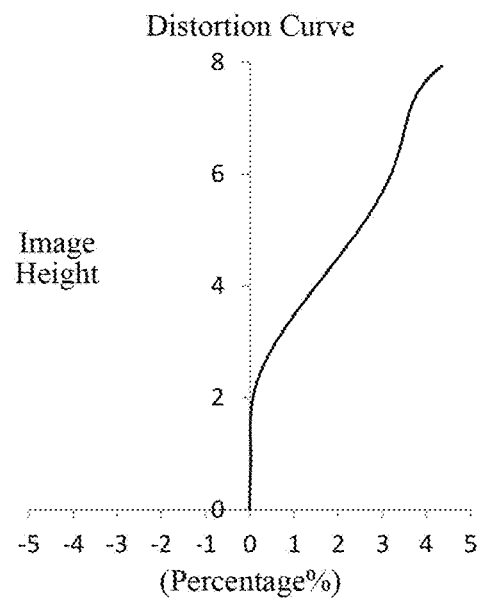

FIG. 2A illustrates a longitudinal aberration curve of the optical imaging lens assembly according to example 1, representing deviations of focal points converged by light of different wavelengths after passing through the lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion corresponding to different image heights. It can be seen from FIG. 2A to FIG. 2C that the optical imaging lens assembly provided in example 1 may achieve good image quality.

Example 2

Figure 3:
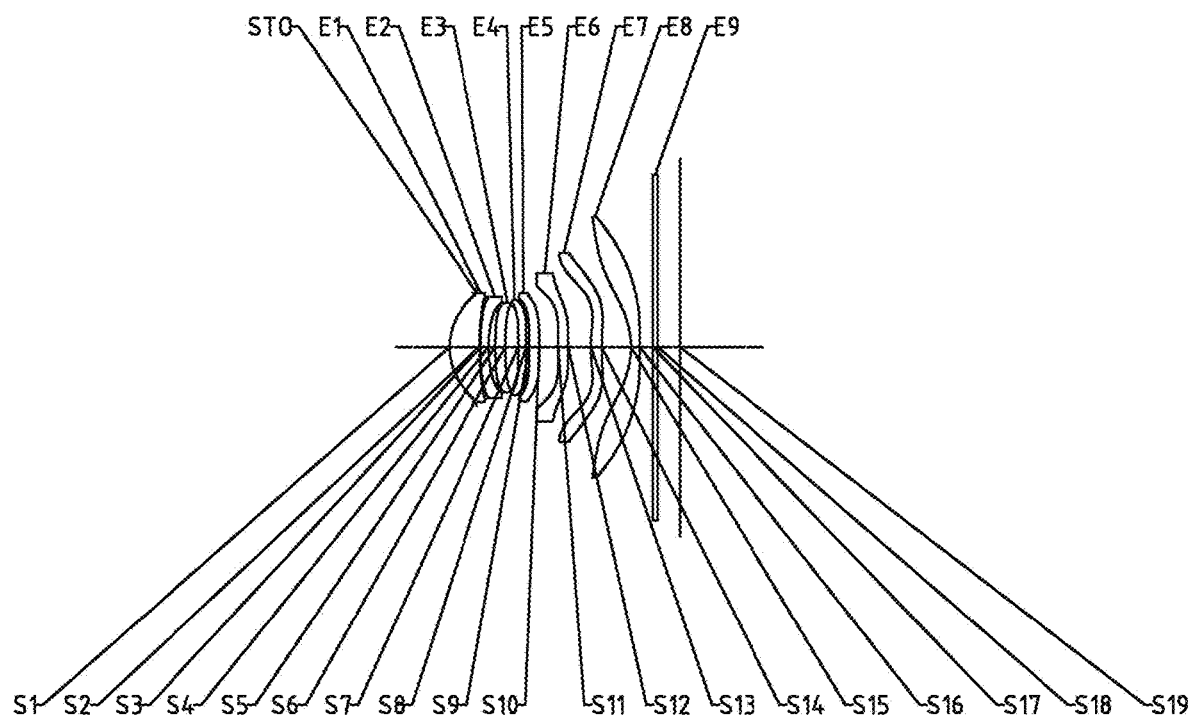
FIG. 3 illustrates a schematic structural view of an optical imaging lens assembly according to example 2 of the present disclosure.

An optical imaging lens assembly according to example 2 of the present disclosure is described below with reference to FIG. 3 to FIG. 4C. In this example and the following examples, for the purpose of brevity, the description of parts similar to those in example 1 will be omitted. FIG. 3 shows a schematic structural view of the optical imaging lens assembly according to example 2 of the present disclosure.

As shown in FIG. 3, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 thereof is a concave surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly is 9.63 mm, a total length TTL of the optical imaging lens assembly is 9.58 mm, half of a diagonal length ImgH of an effective pixel area on the imaging plane S19 of the optical imaging lens assembly is 7.93 mm, half of a maximal field-of-view Semi-FOV of the optical imaging lens assembly is 38.5°, and an aperture value Fno of the optical imaging lens assembly is 2.09.

Table 3 is a table illustrating basic parameters of the optical imaging lens assembly of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Material | | Focal length | Conic coefficient |
| --- | --- | --- | --- | --- | --- | --- | --- |
| | | | | Refractive index | Abbe number | | |
| OBJ | Spherical | Infinite | Infinite | | | | |
| STO | Spherical | Infinite | −1.1445 | | | | |
| S1 | Aspheric | 2.8255 | 1.2572 | 1.55 | 56.1 | 6.44 | 0.0466 |
| S2 | Aspheric | 12.1629 | 0.0500 | | | | 2.1277 |
| S3 | Aspheric | 15.6232 | 0.3300 | 1.68 | 19.2 | −14.20 | 12.7333 |
| S4 | Aspheric | 5.9032 | 0.2725 | | | | 1.8682 |
| S5 | Aspheric | 9.6462 | 0.4197 | 1.55 | 56.1 | 122.91 | 17.1463 |
| S6 | Aspheric | 11.0927 | 0.5435 | | | | 17.5167 |
| S7 | Aspheric | 83.1000 | 0.3300 | 1.57 | 37.4 | −69.38 | 50.0000 |
| S8 | Aspheric | 26.8408 | 0.1184 | | | | 15.5874 |
| S9 | Aspheric | 49.7562 | 0.4198 | 1.68 | 19.2 | 147.03 | 4.7951 |
| S10 | Aspheric | 99.0650 | 0.7913 | | | | 50.0000 |
| S11 | Aspheric | 27.0876 | 0.4163 | 1.57 | 37.4 | 55.87 | −58.0260 |
| S12 | Aspheric | 175.6577 | 0.9427 | | | | 50.0000 |
| S13 | Aspheric | 8.2987 | 0.4480 | 1.55 | 56.1 | 22.14 | 1.3581 |
| S14 | Aspheric | 25.9844 | 1.2106 | | | | 27.8293 |
| S15 | Aspheric | −4.0580 | 0.3637 | 1.54 | 55.9 | −7.09 | −1.2699 |
| S16 | Aspheric | 63.0299 | 0.5417 | | | | 50.0000 |
| S17 | Spherical | Infinite | 0.2100 | 1.52 | 64.2 | | |
| S18 | Spherical | Infinite | 0.9271 | | | | |
| S19 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | 1.6119E−04 | −2.5157E−04 | 1.0330E−04 | 8.4814E−05 | −1.0953E−04 | 5.0786E−05 | −1.2402E−05 | 1.5886E−06 | −8.6559E−08 |
| S2 | −8.3738E−03 | 1.0966E−02 | −8.1343E−03 | 3.7985E−03 | −9.8982E−04 | 1.2472E−04 | −3.1161E−06 | −7.0352E−07 | 3.9078E−08 |
| S3 | −6.5049E−03 | 1.3386E−02 | −1.0527E−02 | 5.7366E−03 | −2.0279E−03 | 4.9289E−04 | −8.5332E−05 | 9.6754E−06 | −5.1509E−07 |
| S4 | −5.6304E−04 | 7.8769E−03 | −7.0340E−03 | 5.9339E−03 | −3.3254E−03 | 1.2728E−03 | −2.9445E−04 | 3.5208E−05 | −1.5290E−06 |
| S5 | −1.0237E−02 | 4.6143E−03 | −3.5853E−03 | 4.3183E−03 | −2.8722E−03 | 1.2270E−03 | −3.0580E−04 | 3.9198E−05 | −1.9302E−06 |
| S6 | −7.7308E−03 | −4.7151E−04 | 6.3386E−03 | −8.2798E−03 | 6.9294E−03 | −3.4921E−03 | 1.0554E−03 | −1.7609E−04 | 1.2520E−05 |
| S7 | −1.3012E−02 | −8.7616E−03 | 7.1850E−03 | −5.9295E−03 | 3.5435E−03 | −1.3272E−03 | 2.9771E−04 | −3.6302E−05 | 1.7440E−06 |
| S8 | −1.9604E−02 | 3.4476E−03 | −6.1647E−03 | 3.9032E−03 | −2.2053E−03 | 1.0999E−03 | −3.4508E−04 | 5.6281E−05 | −3.7130E−06 |
| S9 | −3.0498E−02 | 1.2900E−02 | −7.4333E−03 | 2.4584E−03 | −1.0317E−03 | 5.8643E−04 | −2.0390E−04 | 3.3938E−05 | −2.1536E−06 |
| S10 | −2.9932E−02 | 1.0859E−02 | −6.4995E−03 | 3.3213E−03 | −1.4241E−03 | 4.4646E−04 | −9.0585E−05 | 1.0259E−05 | −4.8028E−07 |
| S11 | −2.7623E−02 | −1.2285E−03 | 3.4539E−03 | −2.0673E−03 | 6.3701E−04 | −1.1243E−04 | 1.1357E−05 | −6.2422E−07 | 1.6074E−08 |
| S12 | −2.4962E−02 | −1.3385E−03 | 3.3309E−03 | −1.5653E−03 | 4.1057E−04 | −6.2811E−05 | 5.5768E−06 | −2.6777E−07 | 5.4010E−09 |
| S13 | −2.7884E−03 | −1.1878E−02 | 3.3476E−03 | −5.7311E−04 | 6.5455E−05 | −4.6771E−06 | 1.9606E−07 | −4.3537E−09 | 3.8982E−11 |
| S14 | 1.2490E−02 | −1.4021E−02 | 3.7704E−03 | −6.3937E−04 | 7.4818E−05 | −5.8354E−06 | 2.8416E−07 | −7.7469E−09 | 8.9925E−11 |
| S15 | −6.5950E−03 | 1.2848E−03 | −4.6981E−05 | −2.9094E−06 | 3.7224E−07 | −1.7740E−08 | 4.6433E−10 | −6.5941E−12 | 3.9783E−14 |
| S16 | −1.7256E−02 | 3.2104E−03 | −4.0046E−04 | 3.3461E−05 | −1.9173E−06 | 7.4914E−08 | −1.9050E−09 | 2.8215E−11 | −1.8298E−13 |

Figure 4A:
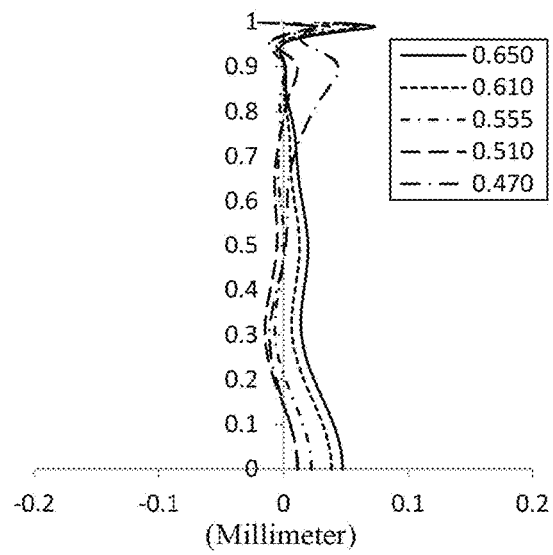
FIGS. 4A to 4C illustrate a longitudinal aberration curve, an astigmatic curve and a distortion curve of the optical imaging lens assembly of the example 2, respectively.
Figure 4B:
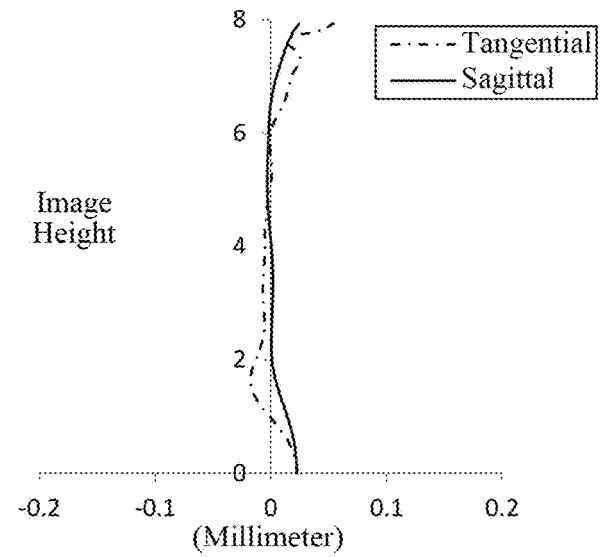
Figure 4C:
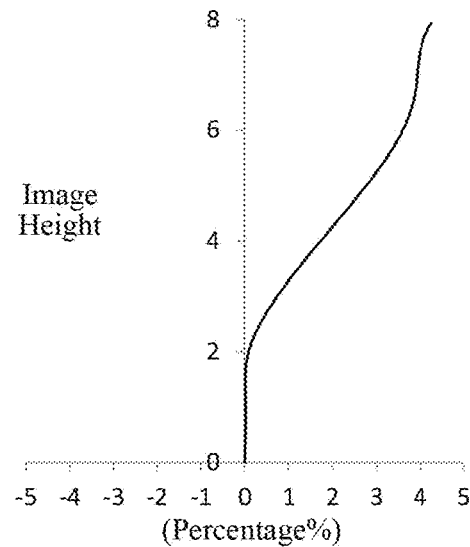

FIG. 4A illustrates a longitudinal aberration curve of the optical imaging lens assembly according to example 2, representing deviations of focal points converged by light of different wavelengths after passing through the lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion corresponding to different image heights. It can be seen from FIG. 4A to FIG. 4C that the optical imaging lens assembly provided in example 2 may achieve good image quality.

Example 3

Figure 5:
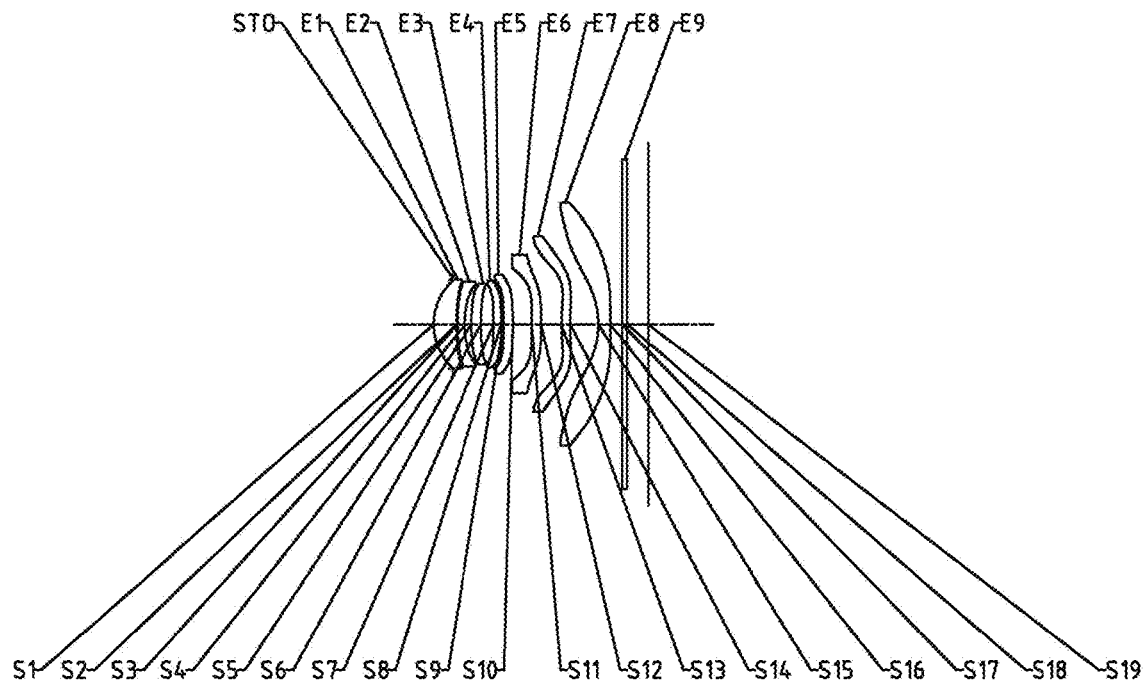
FIG. 5 illustrates a schematic structural view of an optical imaging lens assembly according to example 3 of the present disclosure.

An optical imaging lens assembly according to example 3 of the present disclosure is described below with reference to FIG. 5 to FIG. 6C. FIG. 5 shows a schematic structural view of the optical imaging lens assembly according to example 3 of the present disclosure.

As shown in FIG. 5, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 thereof is a concave surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly is 9.40 mm, a total length TTL of the optical imaging lens assembly is 9.30 mm, half of a diagonal length ImgH of an effective pixel area on the imaging plane S19 of the optical imaging lens assembly is 7.93 mm, half of a maximal field-of-view Semi-FOV of the optical imaging lens assembly is 39.2°, and an aperture value Fno of the optical imaging lens assembly is 2.40.

Table 5 is a table illustrating basic parameters of the optical imaging lens assembly of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.8453 | | | | |
| S1 | Aspheric | 2.6884 | 0.9849 | 1.55 | 56.1 | 6.55 | 0.0416 |
| S2 | Aspheric | 9.4405 | 0.0500 | | | | 4.5013 |
| S3 | Aspheric | 10.6125 | 0.3300 | 1.68 | 19.2 | −14.57 | 13.7820 |
| S4 | Aspheric | 5.0493 | 0.2835 | | | | 2.7344 |

TABLE 5-continued

| Surface number | Surface type | Radius of curvature | Thickness/ Distance | Material Refractive index | Abbe number | Focal length | Conic coefficient |
|---|---|---|---|---|---|---|---|
| S5 | Aspheric | 8.3536 | 0.4179 | 1.55 | 56.1 | 72.26 | 17.6920 |
| S6 | Aspheric | 10.4107 | 0.5513 | | | | 24.0018 |
| S7 | Aspheric | −63.8446 | 0.3300 | 1.57 | 37.4 | −205.51 | −99.0000 |
| S8 | Aspheric | −139.8107 | 0.0964 | | | | 25.0769 |
| S9 | Aspheric | 115.9055 | 0.3968 | 1.68 | 19.2 | 324.98 | 9.9946 |
| S10 | Aspheric | 244.3870 | 0.8218 | | | | −34.4288 |
| S11 | Aspheric | 24.4720 | 0.4023 | 1.57 | 37.4 | 59.69 | −49.0770 |
| S12 | Aspheric | 85.6165 | 0.8802 | | | | 50.0000 |
| S13 | Aspheric | 7.8122 | 0.3828 | 1.55 | 56.1 | 22.15 | 1.4401 |
| S14 | Aspheric | 21.6917 | 1.2200 | | | | 24.9351 |
| S15 | Aspheric | −3.9815 | 0.5107 | 1.54 | 55.9 | −6.58 | −1.2265 |
| S16 | Aspheric | 32.6105 | 0.5272 | | | | 22.1426 |
| S17 | Spherical | Infinite | 0.2100 | 1.52 | 64.2 | | |
| S18 | Spherical | Infinite | 0.9089 | | | | |
| S19 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | 7.3651E−04 | −1.7130E−03 | 2.5891E−03 | −2.2713E−03 | 1.2429E−03 | −4.2983E−04 | 9.0981E−05 | −1.0731E−05 | 5.3261E−07 |
| S2 | −8.7916E−03 | 1.3040E−02 | −1.2483E−02 | 9.2042E−03 | −4.8596E−03 | 1.7987E−03 | −4.4053E−04 | 6.3052E−05 | −3.9291E−06 |
| S3 | −6.5026E−03 | 1.3334E−02 | −1.0686E−02 | 6.4631E−03 | −2.7864E−03 | 9.0915E−04 | −2.2268E−04 | 3.4817E−05 | −2.4159E−06 |
| S4 | 7.1573E−05 | 7.8635E−03 | −7.1085E−03 | 7.0357E−03 | −4.8967E−03 | 2.4282E−03 | −7.5474E−04 | 1.2702E−04 | −8.6252E−06 |
| S5 | −9.2632E−03 | 2.9582E−03 | −9.7743E−04 | 2.7676E−03 | −2.8434E−03 | 1.8239E−03 | −6.5892E−04 | 1.2208E−04 | −9.1259E−06 |
| S6 | −9.2903E−03 | 4.4560E−03 | −4.8868E−03 | 6.1993E−03 | −4.1506E−03 | 1.7387E−03 | −4.1587E−04 | 4.8592E−05 | −1.6472E−06 |
| S7 | −1.1063E−02 | −1.6044E−02 | 1.7065E−02 | −1.6165E−02 | 1.0579E−02 | −4.5233E−03 | 1.2388E−03 | −1.9807E−04 | 1.3910E−05 |
| S8 | −1.3711E−02 | −1.3575E−02 | 1.3988E−02 | −1.3726E−02 | 8.2447E−03 | −2.8680E−03 | 5.8063E−04 | −6.4879E−05 | 3.0695E−06 |
| S9 | −2.7004E−02 | 1.6651E−03 | 6.1537E−03 | −9.3032E−03 | 5.9099E−03 | −2.0037E−03 | 3.7200E−04 | −3.5367E−05 | 1.2910E−06 |
| S10 | −2.9621E−02 | 8.4214E−03 | −3.6730E−03 | 1.2065E−03 | −3.8506E−04 | 1.1929E−04 | −2.8576E−05 | 3.8775E−06 | −2.0532E−07 |
| S11 | −2.8596E−02 | −1.6152E−03 | 4.2009E−03 | −2.7113E−03 | 9.0719E−04 | −1.7867E−04 | 2.1022E−05 | −1.4053E−06 | 4.3700E−08 |
| S12 | −2.6883E−02 | −7.5760E−04 | 3.5596E−03 | −1.8136E−03 | 4.9530E−04 | −7.7786E−05 | 7.0611E−06 | −3.4663E−07 | 7.1609E−09 |
| S13 | −2.0093E−03 | −1.3702E−02 | 4.1393E−03 | −7.4620E−04 | 8.6252E−05 | −5.9496E−06 | 2.2196E−07 | −3.5584E−09 | 5.8555E−12 |
| S14 | 1.5008E−02 | −1.6398E−02 | 4.7241E−03 | −8.6132E−04 | 1.0703E−04 | −8.7795E−06 | 4.4821E−07 | −1.2818E−08 | 1.5636E−10 |
| S15 | −5.6821E−03 | 7.8780E−04 | 6.0842E−05 | −1.5401E−05 | 1.2487E−06 | −5.6909E−08 | 1.5666E−09 | −2.4482E−11 | 1.6749E−13 |
| S16 | −1.6110E−02 | 2.3932E−03 | −2.5587E−04 | 1.9682E−05 | −1.1158E−06 | 4.5533E−08 | −1.2423E−09 | 1.9822E−11 | −1.3722E−13 |

Figure 6A:
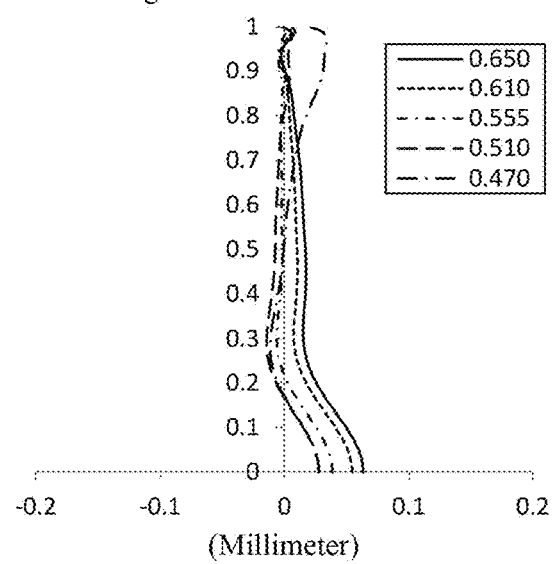
FIGS. 6A to 6C illustrate a longitudinal aberration curve, an astigmatic curve and a distortion curve of the optical imaging lens assembly of the example 3, respectively.
Figure 6B:
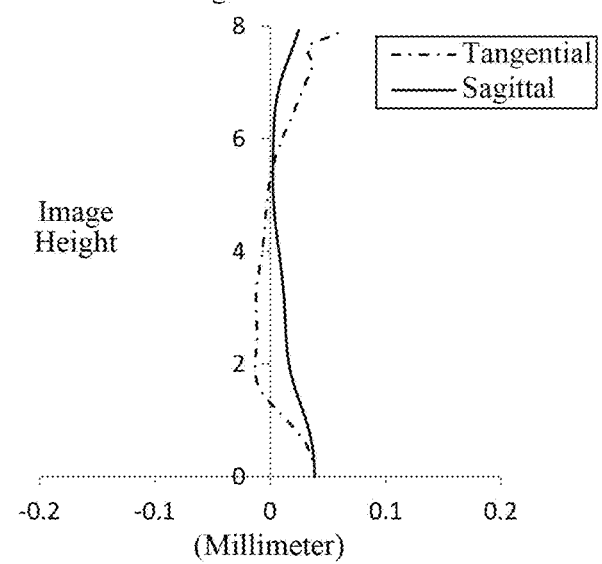
Figure 6C:
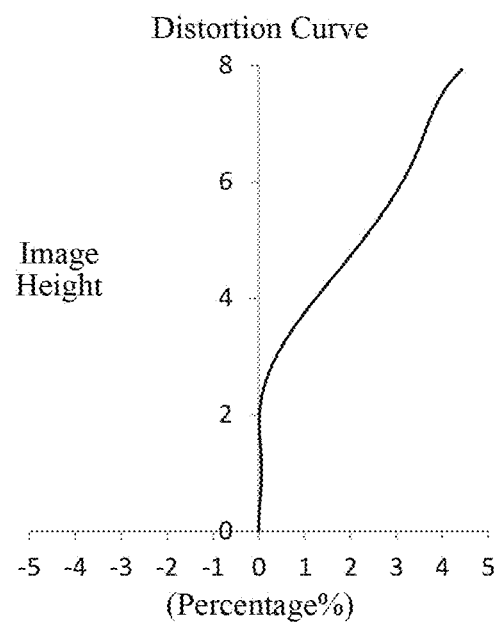

FIG. 6A illustrates a longitudinal aberration curve of the optical imaging lens assembly according to example 3, representing deviations of focal points converged by light of different wavelengths after passing through the lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion corresponding to different image heights. It can be seen from FIG. 6A to FIG. 6C that the optical imaging lens assembly provided in example 3 may achieve good image quality.

Example 4

Figure 7:
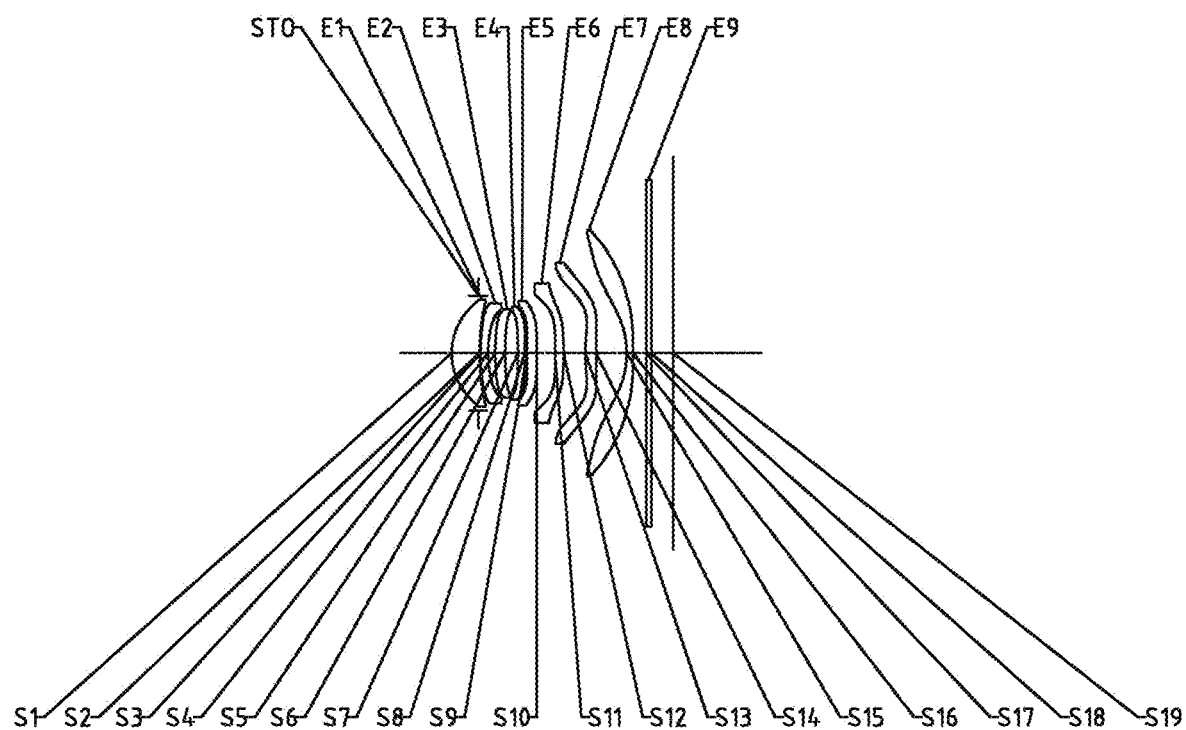
FIG. 7 illustrates a schematic structural view of an optical imaging lens assembly according to example 4 of the present disclosure.

An optical imaging lens assembly according to example 4 of the present disclosure is described below with reference to FIG. 7 to FIG. 8C. FIG. 7 shows a schematic structural view of the optical imaging lens assembly according to example 4 of the present disclosure.

As shown in FIG. 7, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 thereof is a concave surface. The eighth lens E8 has negative refractive power, an object-side surface S15 thereof is a concave surface, and an image-side surface S16 thereof is a convex surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly is 9.37 mm, a total length TTL of the optical imaging lens assembly is 9.27 mm, half of a diagonal length ImgH of an effective pixel area on the imaging plane S19 of the optical imaging lens assembly is 7.70 mm, half of a maximal field-of-view Semi-FOV of the optical imaging lens assembly is 38.4°, and an aperture value Fno of the optical imaging lens assembly is 2.09.

Table 7 is a table illustrating basic parameters of the optical imaging lens assembly of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −1.1276 | | | | |
| S1 | Aspheric | 2.7204 | 1.1763 | 1.55 | 56.1 | 6.26 | 0.0471 |
| S2 | Aspheric | 11.3006 | 0.0500 | | | | 2.7422 |
| S3 | Aspheric | 13.7681 | 0.3000 | 1.68 | 19.2 | −13.70 | 13.8781 |
| S4 | Aspheric | 5.4953 | 0.2973 | | | | 2.0438 |
| S5 | Aspheric | 9.2499 | 0.4129 | 1.55 | 56.1 | 126.60 | 17.1092 |
| S6 | Aspheric | 10.5108 | 0.5312 | | | | 17.8435 |
| S7 | Aspheric | 52.7564 | 0.3000 | 1.57 | 37.4 | −55.43 | 50.0000 |
| S8 | Aspheric | 19.7772 | 0.1008 | | | | −47.8833 |
| S9 | Aspheric | 31.8482 | 0.3981 | 1.68 | 19.2 | 98.47 | −64.1128 |
| S10 | Aspheric | 60.6281 | 0.7674 | | | | 50.0000 |
| S11 | Aspheric | 26.0239 | 0.3523 | 1.57 | 37.4 | 53.55 | −44.6178 |
| S12 | Aspheric | 171.0992 | 0.9168 | | | | 50.0000 |
| S13 | Aspheric | 7.9430 | 0.4409 | 1.55 | 56.1 | 22.47 | 1.4363 |
| S14 | Aspheric | 22.0942 | 1.2897 | | | | 23.7402 |
| S15 | Aspheric | −3.8275 | 0.2600 | 1.54 | 55.9 | −7.13 | −1.2183 |
| S16 | Aspheric | −12506.8849 | 0.5478 | | | | 50.0000 |
| S17 | Spherical | Infinite | 0.2100 | 1.52 | 64.2 | | |
| S18 | Spherical | Infinite | 0.9223 | | | | |
| S19 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | 9.6103E−05 | −4.7320E−05 | −2.0266E−04 | 3.9932E−04 | −3.1263E−04 | 1.3087E−04 | −3.1277E−05 | 4.0422E−06 | −2.2426E−07 |
| S2 | −1.0239E−02 | 1.5477E−02 | −1.1688E−02 | 4.8644E−03 | −7.9199E−04 | −1.1738E−04 | 6.8890E−05 | −1.0290E−05 | 5.2833E−07 |
| S3 | −9.0721E−03 | 1.9695E−02 | −1.5845E−02 | 7.9049E−03 | −2.2367E−03 | 3.4345E−04 | −2.7461E−05 | 1.6161E−06 | −1.1175E−07 |
| S4 | −2.0632E−03 | 1.2868E−02 | −1.3535E−02 | 1.2134E−02 | −7.3330E−03 | 3.0296E−03 | −7.7998E−04 | 1.0973E−04 | −6.2663E−06 |
| S5 | −1.1300E−02 | 5.2018E−03 | −2.4763E−03 | 2.4780E−03 | −1.3581E−03 | 5.3858E−04 | −1.2457E−04 | 1.2587E−05 | −1.9060E−07 |
| S6 | −8.8119E−03 | −6.8544E−04 | 9.1122E−03 | −1.2724E−02 | 1.1097E−02 | −5.8345E−03 | 1.8410E−03 | −3.2114E−04 | 2.3933E−05 |
| S7 | −1.5046E−02 | −9.9608E−03 | 9.5103E−03 | −9.3695E−03 | 6.6731E−03 | −3.0080E−03 | 8.2509E−04 | −1.2617E−04 | 8.1304E−06 |
| S8 | −2.4144E−02 | 7.5639E−03 | −1.0057E−02 | 5.8564E−03 | −2.9812E−03 | 1.4922E−03 | −5.0246E−04 | 8.8843E−05 | −6.3488E−06 |
| S9 | −3.6693E−02 | 1.8635E−02 | −1.1725E−02 | 4.2998E−03 | −1.7409E−03 | 9.6646E−04 | −3.5750E−04 | 6.4999E−05 | −4.5577E−06 |
| S10 | −3.3434E−02 | 1.2968E−02 | −8.0609E−03 | 4.2363E−03 | −1.8952E−03 | 6.3092E−04 | −1.3780E−04 | 1.6943E−05 | −8.6626E−07 |
| S11 | −3.0698E−02 | −3.3056E−03 | 6.3605E−03 | −3.9667E−03 | 1.3339E−03 | −2.6317E−04 | 3.0350E−05 | −1.9325E−06 | 5.6372E−08 |
| S12 | −2.8340E−02 | −3.1925E−03 | 5.8107E−03 | −2.9548E−03 | 8.5344E−04 | −1.4501E−04 | 1.4394E−05 | −7.7696E−07 | 1.7699E−08 |
| S13 | −3.3961E−03 | −1.4320E−02 | 4.5617E−03 | −9.1938E−04 | 1.2595E−04 | −1.0974E−05 | 5.7860E−07 | −1.7005E−08 | 2.1670E−10 |
| S14 | 1.2600E−02 | −1.6214E−02 | 4.7668E−03 | −8.9448E−04 | 1.1496E−04 | −9.6905E−06 | 5.0221E−07 | −1.4361E−08 | 1.7196E−10 |
| S15 | −8.2838E−03 | 2.0027E−03 | −1.6500E−04 | 8.3793E−06 | −3.0996E−07 | 8.5305E−09 | −1.6304E−10 | 1.9756E−12 | −1.2495E−14 |
| S16 | −1.9062E−02 | 3.8956E−03 | −5.2563E−04 | 4.7914E−05 | −3.0365E−06 | 1.3256E−07 | −3.7807E−09 | 6.2729E−11 | −4.5417E−13 |

Figure 8A:
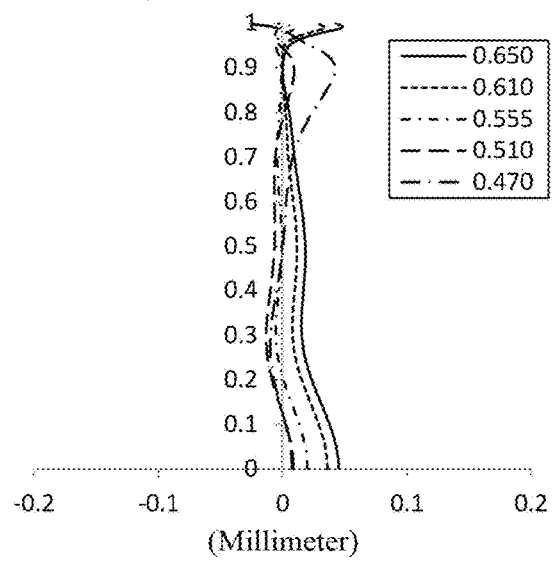
FIGS. 8A to 8C illustrate a longitudinal aberration curve, an astigmatic curve and a distortion curve of the optical imaging lens assembly of the example 4, respectively.
Figure 8B:
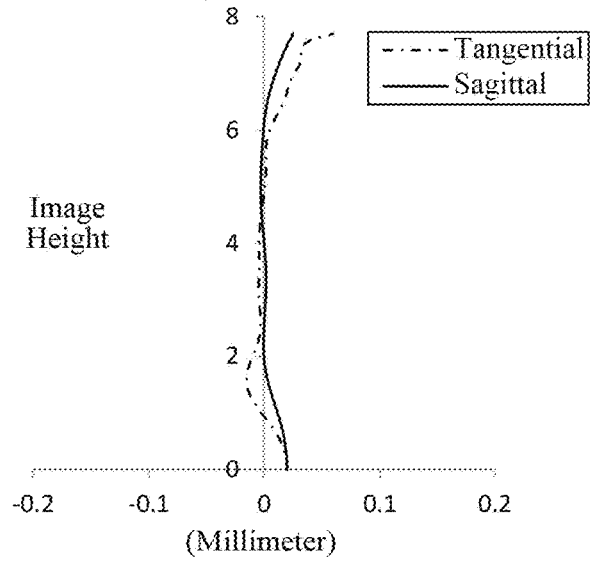
Figure 8C:
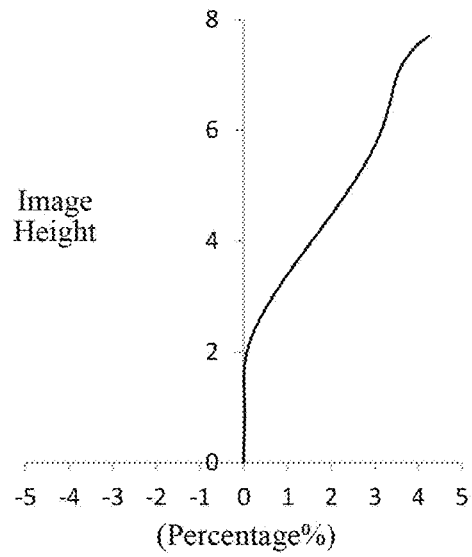

FIG. 8A illustrates a longitudinal aberration curve of the optical imaging lens assembly according to example 4, representing deviations of focal points converged by light of different wavelengths after passing through the lens assembly. FIG. 8B illustrates an astigmatic curve of the optical imaging lens assembly according to example 4, representing a curvature of a tangential plane and a curvature of a sagittal plane. FIG. 8C illustrates a distortion curve of the optical imaging lens assembly according to example 4, representing amounts of distortion corresponding to different image heights. It can be seen from FIG. 8A to FIG. 8C that the optical imaging lens assembly provided in example 4 may achieve good image quality.

Example 5

Figure 9:
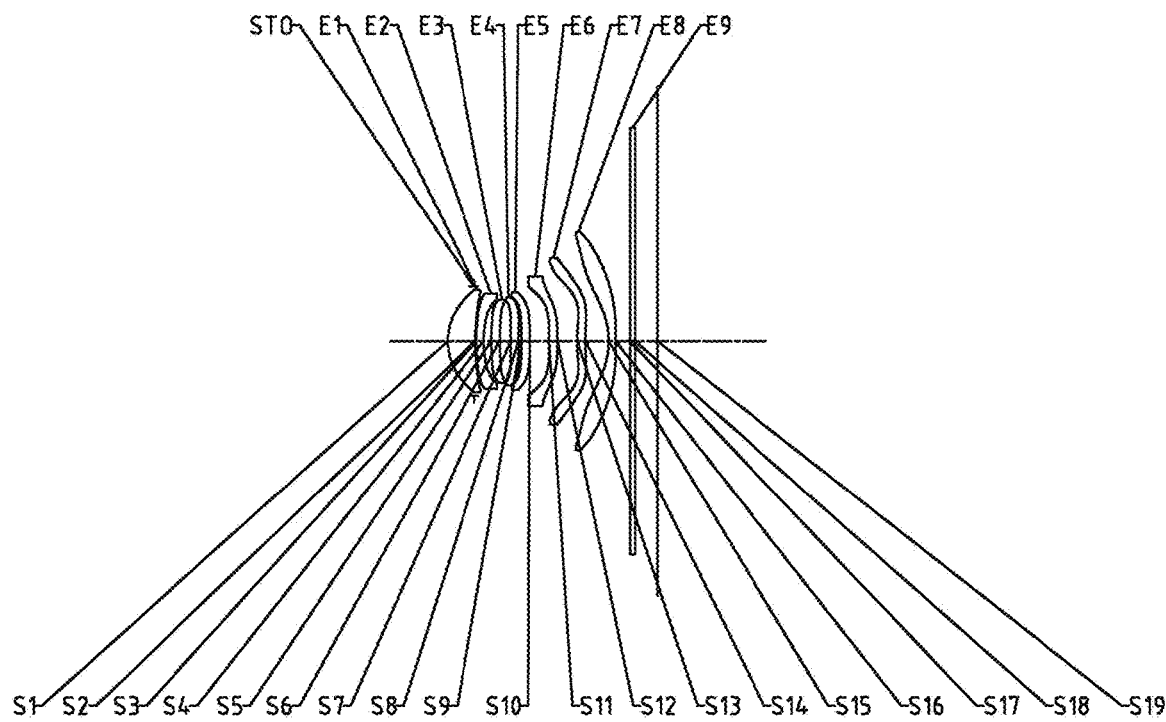
FIG. 9 illustrates a schematic structural view of an optical imaging lens assembly according to example 5 of the present disclosure.

An optical imaging lens assembly according to example 5 of the present disclosure is described below with reference to FIG. 9 to FIG. 10C. FIG. 9 shows a schematic structural view of the optical imaging lens assembly according to example 5 of the present disclosure.

As shown in FIG. 9, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has positive refractive power, an object-side surface S13 thereof is a convex surface, and an image-side surface S14 thereof is a concave surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly is 9.08 mm, a total length TTL of the optical imaging lens assembly is 8.90 mm, half of a diagonal length ImgH of an effective pixel area on the imaging plane S19 of the optical imaging lens assembly is 7.00 mm, half of a maximal field-of-view Semi-FOV of the optical imaging lens assembly is 36.6°, and an aperture value Fno of the optical imaging lens assembly is 2.90.

Table 9 is a table illustrating basic parameters of the optical imaging lens assembly of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −1.1306 | | | | |
| S1 | Aspheric | 2.5748 | 1.1956 | 1.55 | 56.1 | 5.72 | 0.0591 |
| S2 | Aspheric | 12.2384 | 0.0500 | | | | 6.0272 |
| S3 | Aspheric | 15.6034 | 0.3000 | 1.68 | 19.2 | −11.87 | 14.4030 |
| S4 | Aspheric | 5.2672 | 0.3144 | | | | 1.4498 |
| S5 | Aspheric | 9.8910 | 0.3571 | 1.55 | 56.1 | 1062.75 | 15.5220 |
| S6 | Aspheric | 9.9342 | 0.4753 | | | | 11.2589 |
| S7 | Aspheric | 18.1521 | 0.3311 | 1.57 | 37.4 | −72.46 | 50.0000 |
| S8 | Aspheric | 12.5443 | 0.1133 | | | | 23.0025 |
| S9 | Aspheric | 29.8097 | 0.3683 | 1.68 | 19.2 | 76.51 | 50.0000 |
| S10 | Aspheric | 69.7972 | 0.8072 | | | | 50.0000 |
| S11 | Aspheric | 58.8988 | 0.3567 | 1.57 | 37.4 | 48.31 | 50.0000 |
| S12 | Aspheric | −52.0510 | 0.8374 | | | | −99.0000 |
| S13 | Aspheric | 7.2525 | 0.3500 | 1.55 | 56.1 | 20.57 | 1.2144 |
| S14 | Aspheric | 20.1223 | 0.9803 | | | | 24.1642 |
| S15 | Aspheric | −3.6928 | 0.3000 | 1.54 | 55.9 | −6.78 | −1.2691 |
| S16 | Aspheric | 249.8212 | 0.6102 | | | | −99.0000 |
| S17 | Spherical | Infinite | 0.2100 | 1.52 | 64.2 | | |
| S18 | Spherical | Infinite | 0.9503 | | | | |
| S19 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | 1.1424E−04 | −5.8071E−04 | 4.6624E−04 | −9.8463E−05 | −1.0845E−04 | 8.6941E−05 | −2.8313E−05 | 4.5319E−06 | −3.0211E−07 |
| S2 | −1.0394E−02 | 2.1460E−02 | −2.1426E−02 | 1.2988E−02 | −4.6485E−03 | 9.6342E−04 | −1.0941E−04 | 5.8852E−06 | −1.0766E−07 |
| S3 | −7.6108E−03 | 2.5950E−02 | −2.6028E−02 | 1.6797E−02 | −6.7265E−03 | 1.7360E−03 | −2.9904E−04 | 3.3250E−05 | −1.8091E−06 |
| S4 | −1.0995E−03 | 1.9119E−02 | −2.5821E−02 | 2.9306E−02 | −2.1972E−02 | 1.0915E−02 | −3.3474E−03 | 5.6630E−04 | −3.9976E−05 |
| S5 | −1.6198E−02 | 1.0620E−02 | −7.4325E−03 | 9.2545E−03 | −7.0043E−03 | 3.5174E−03 | −1.0658E−03 | 1.7137E−04 | −1.0923E−05 |
| S6 | −1.4485E−02 | 2.3234E−03 | 1.2764E−02 | −2.1734E−02 | 2.2068E−02 | −1.3365E−02 | 4.8206E−03 | −9.5705E−04 | 8.0861E−05 |
| S7 | −2.2999E−02 | 2.8070E−04 | −1.0434E−02 | 1.6469E−02 | −1.4938E−02 | 8.5334E−03 | −2.9869E−03 | 5.8192E−04 | −4.8711E−05 |
| S8 | −3.7971E−02 | 3.2441E−02 | −5.3537E−02 | 5.3416E−02 | −3.5964E−02 | 1.5817E−02 | −4.2359E−03 | 6.1724E−04 | −3.7602E−05 |
| S9 | −4.9809E−02 | 3.3991E−02 | −3.4183E−02 | 2.5461E−02 | −1.4405E−02 | 5.5498E−03 | −1.2440E−03 | 1.2904E−04 | −3.3250E−06 |
| S10 | −4.1705E−02 | 1.7321E−02 | −1.3106E−02 | 8.3350E−03 | −4.2847E−03 | 1.5766E−03 | −3.7118E−04 | 4.8399E−05 | −2.5979E−06 |
| S11 | −3.6826E−02 | −2.6510E−03 | 7.0989E−03 | −5.1495E−03 | 1.8997E−03 | −3.9399E−04 | 4.5160E−05 | −2.5618E−06 | 5.6050E−08 |
| S12 | −3.4862E−02 | −1.4737E−03 | 6.3640E−03 | −3.8033E−03 | 1.2351E−03 | −2.3073E−04 | 2.4954E−05 | −1.4657E−06 | 3.6466E−08 |
| S13 | −3.7353E−03 | −2.1710E−02 | 7.8120E−03 | −1.7039E−03 | 2.4874E−04 | −2.3078E−05 | 1.2966E−06 | −4.0777E−08 | 5.6471E−10 |
| S14 | 1.7569E−02 | −2.5893E−02 | 8.8713E−03 | −1.9022E−03 | 2.7927E−04 | −2.7179E−05 | 1.6466E−06 | −5.5693E−08 | 7.9815E−10 |
| S15 | −1.1749E−02 | 3.3845E−03 | −2.7613E−04 | 4.1147E−06 | 9.9663E−07 | −9.0114E−08 | 3.6024E−09 | −7.1736E−11 | 5.6769E−13 |
| S16 | −2.5051E−02 | 6.2313E−03 | −1.0227E−03 | 1.1216E−04 | −8.3610E−06 | 4.1911E−07 | −1.3467E−08 | 2.4815E−10 | −1.9692E−12 |

Figures 10A, 10B:
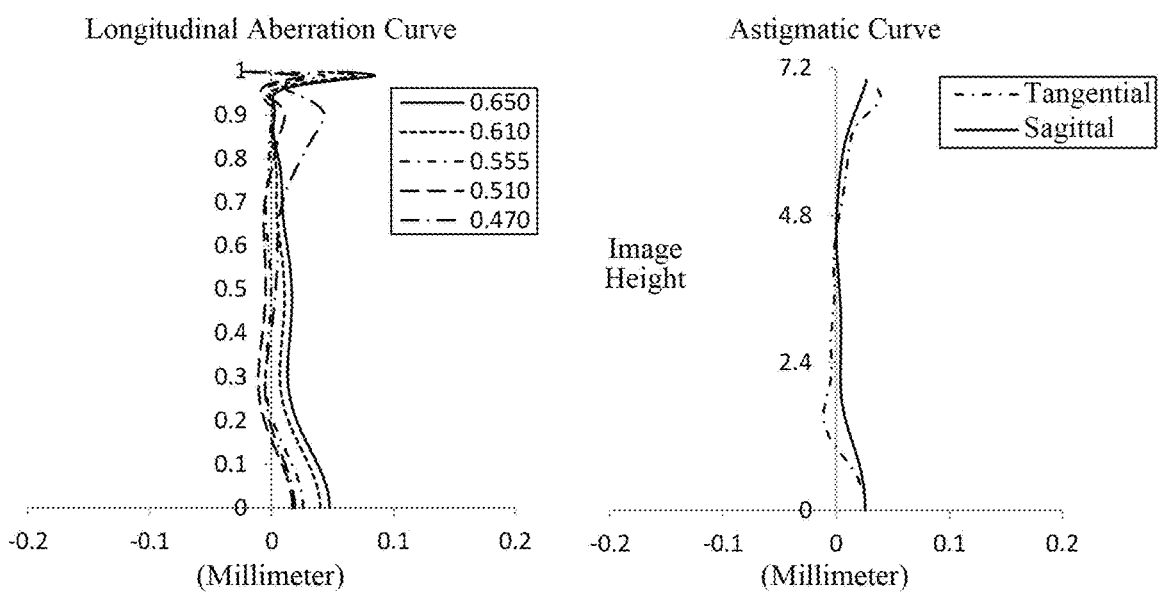
FIGS. 10A to 10C illustrate a longitudinal aberration curve, an astigmatic curve and a distortion curve of the optical imaging lens assembly of the example 5, respectively.
Figure 10C:
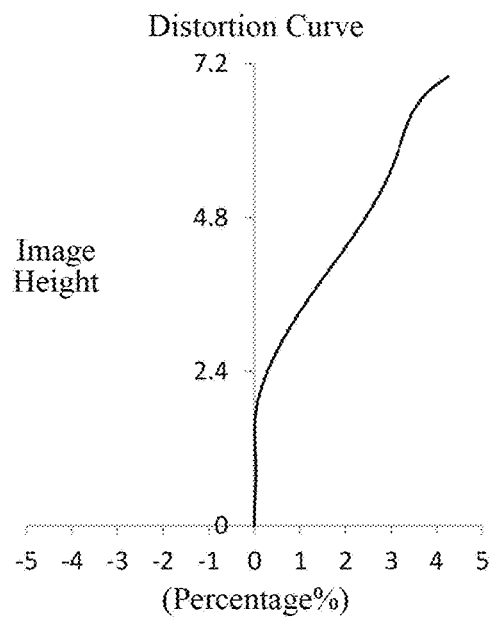

FIG. 10A illustrates a longitudinal aberration curve of the optical imaging lens assembly according to example 5, representing deviations of focal points converged by light of different wavelengths after passing through the lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion corresponding to different image heights. It can be seen from FIG. 10A to FIG. 10C that the optical imaging lens assembly provided in example 5 may achieve good image quality.

Example 6

Figure 11:
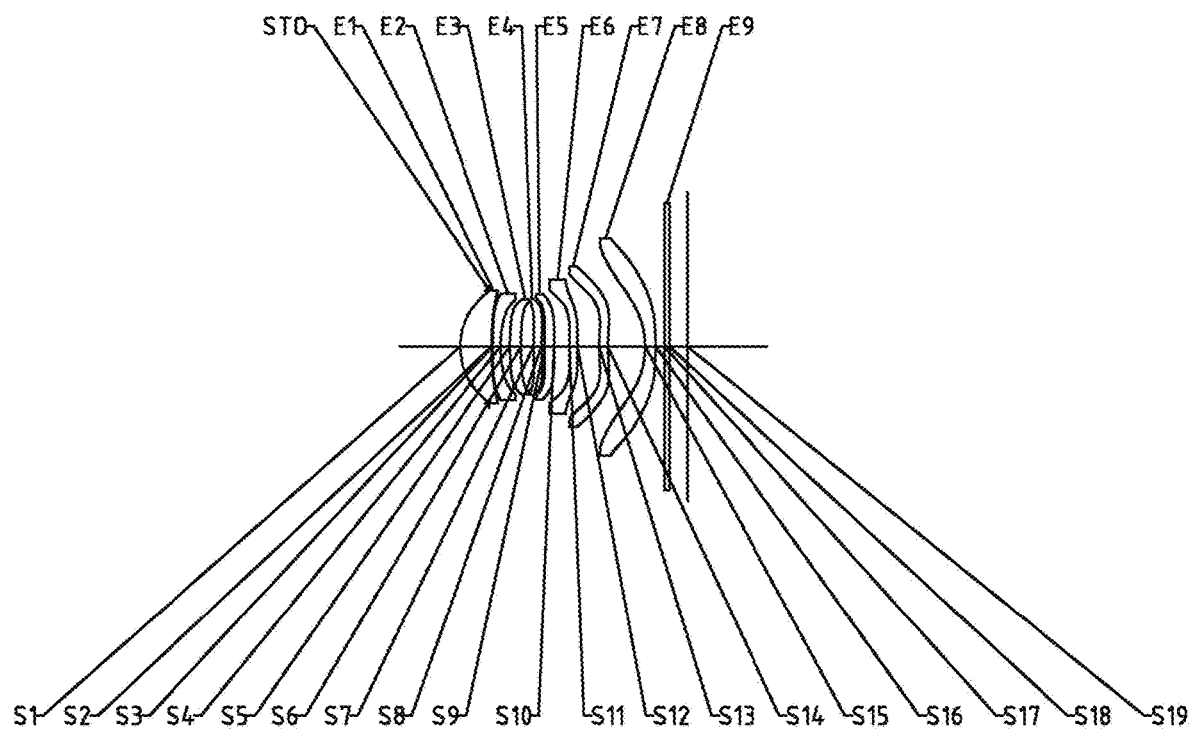
FIG. 11 illustrates a schematic structural view of an optical imaging lens assembly according to example 6 of the present disclosure.

An optical imaging lens assembly according to example 6 of the present disclosure is described below with reference to FIG. 11 to FIG. 12C. FIG. 11 shows a schematic structural view of the optical imaging lens assembly according to example 6 of the present disclosure.

As shown in FIG. 11, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 thereof is a concave surface. The eighth lens E8 has negative refractive power, an object-side surface S15 thereof is a concave surface, and an image-side surface S16 thereof is a convex surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly is 9.69 mm, a total length TTL of the optical imaging lens assembly is 9.45 mm, half of a diagonal length ImgH of an effective pixel area on the imaging plane S19 of the optical imaging lens assembly is 6.50 mm, half of a maximal field-of-view Semi-FOV of the optical imaging lens assembly is 32.9°, and an aperture value Fno of the optical imaging lens assembly is 2.03.

Table 11 is a table illustrating basic parameters of the optical imaging lens assembly of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

TABLE 11

| Surface number | Surface type | Radius of curvature | Thickness/ Distance | Material | | Focal length | Conic coefficient |
| | | | | Refractive index | Abbe number | | |
|---|---|---|---|---|---|---|---|
| OBJ | Spherical | Infinite | Infinite | | | | |
| STO | Spherical | Infinite | −1.2323 | | | | |
| S1 | Aspheric | 2.8406 | 1.3243 | 1.55 | 56.1 | 6.20 | 0.0402 |
| S2 | Aspheric | 14.7127 | 0.0500 | | | | 12.4313 |
| S3 | Aspheric | 23.9909 | 0.3300 | 1.68 | 19.2 | −12.43 | 24.7006 |
| S4 | Aspheric | 6.1995 | 0.3727 | | | | 1.5421 |

TABLE 11-continued

| Surface number | Surface type | Radius of curvature | Thickness/ Distance | Material Refractive index | Abbe number | Focal length | Conic coefficient |
|---|---|---|---|---|---|---|---|
| S5 | Aspheric | 9.2563 | 0.4675 | 1.55 | 56.1 | 121.40 | 16.5371 |
| S6 | Aspheric | 10.5670 | 0.5260 | | | | 16.9710 |
| S7 | Aspheric | 13.6563 | 0.3300 | 1.57 | 37.4 | −76.43 | −2.5744 |
| S8 | Aspheric | 10.3171 | 0.1241 | | | | −2.3040 |
| S9 | Aspheric | 14.2333 | 0.3937 | 1.68 | 19.2 | 64.27 | −18.9298 |
| S10 | Aspheric | 20.9089 | 0.6489 | | | | −39.3624 |
| S11 | Aspheric | 20.9268 | 0.3300 | 1.57 | 37.4 | 61.28 | −48.1524 |
| S12 | Aspheric | 51.5438 | 0.8857 | | | | 10.7656 |
| S13 | Aspheric | 7.0060 | 0.3734 | 1.55 | 56.1 | 160.87 | −0.1173 |
| S14 | Aspheric | 7.4700 | 1.5470 | | | | −40.9660 |
| S15 | Aspheric | −3.9992 | 0.4317 | 1.54 | 55.9 | −8.88 | −1.0219 |
| S16 | Aspheric | −25.8154 | 0.3639 | | | | −73.8740 |
| S17 | Spherical | Infinite | 0.2100 | 1.52 | 64.2 | | |
| S18 | Spherical | Infinite | 0.7503 | | | | |
| S19 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | 1.1942E−04 | −6.7666E−04 | 5.6186E−04 | −2.0944E−04 | 2.6044E−06 | 2.3769E−05 | −8.1437E−06 | 1.1591E−06 | −6.3994E−08 |
| S2 | −9.8602E−03 | 1.2804E−02 | −7.9057E−03 | 2.3723E−03 | 1.6577E−04 | −3.3710E−04 | 9.7591E−05 | −1.2181E−05 | 5.7690E−07 |
| S3 | −8.1278E−03 | 1.3679E−02 | −7.4155E−03 | 1.7244E−03 | 5.4151E−04 | −4.6174E−04 | 1.2143E−04 | −1.4593E−05 | 6.7847E−07 |
| S4 | −1.8641E−03 | 9.3424E−03 | −9.1828E−03 | 8.9103E−03 | −5.6008E−03 | 2.3005E−03 | −5.8073E−04 | 8.0646E−05 | −4.6785E−06 |
| S5 | −9.8230E−03 | 2.4313E−03 | 7.7422E−05 | 1.3752E−03 | −1.1518E−03 | 5.3967E−04 | −1.4554E−04 | 2.0300E−05 | −1.1084E−06 |
| S6 | −9.2090E−03 | −2.5760E−03 | 9.4484E−03 | −1.0151E−02 | 7.6621E−03 | −3.6443E−03 | 1.0518E−03 | −1.6822E−04 | 1.1491E−05 |
| S7 | −1.2776E−02 | −1.1012E−02 | 5.0489E−03 | 7.1649E−04 | −2.0527E−03 | 1.2339E−03 | −3.9030E−04 | 6.5176E−05 | −4.5771E−06 |
| S8 | −1.4519E−02 | −5.1475E−03 | −5.7851E−03 | 8.6726E−03 | −5.1727E−03 | 1.7878E−03 | −3.7261E−04 | 4.3024E−05 | −2.1564E−06 |
| S9 | −2.5878E−02 | 5.1812E−03 | −2.2832E−03 | −1.3759E−03 | 2.4902E−03 | −1.4782E−03 | 4.4826E−04 | −7.0335E−05 | 4.5068E−06 |
| S10 | −3.1408E−02 | 8.9990E−03 | −4.6536E−03 | 2.0787E−03 | −7.1252E−04 | 1.4197E−04 | −1.2061E−05 | −4.2943E−07 | 1.1292E−07 |
| S11 | −3.0430E−02 | −6.8702E−04 | 1.7409E−03 | −1.3947E−03 | 6.7198E−04 | −2.0930E−04 | 3.9100E−05 | −3.9551E−06 | 1.6985E−07 |
| S12 | −2.5908E−02 | 1.4435E−03 | −5.4139E−05 | 2.0772E−04 | −1.0731E−04 | 2.7101E−05 | −3.5388E−06 | 2.2783E−07 | −5.7297E−09 |
| S13 | −2.5171E−02 | −7.6268E−03 | 3.2137E−03 | −8.4690E−04 | 1.6270E−04 | −2.1209E−05 | 1.7971E−06 | −8.8310E−08 | 1.8670E−09 |
| S14 | −3.5800E−03 | −1.2117E−02 | 4.4444E−03 | −1.0182E−03 | 1.5554E−04 | −1.4939E−05 | 8.5304E−07 | −2.6389E−08 | 3.4048E−10 |
| S15 | −8.8198E−03 | 8.6435E−04 | −2.9057E−05 | 1.1621E−05 | −1.8511E−06 | 1.2059E−07 | −3.6873E−09 | 4.8485E−11 | −1.5975E−13 |
| S16 | −1.5265E−02 | 1.4737E−03 | −7.5352E−05 | 8.5998E−06 | −1.7673E−06 | 1.8621E−07 | −1.0085E−08 | 2.7559E−10 | −3.0095E−12 |

Figure 12A:
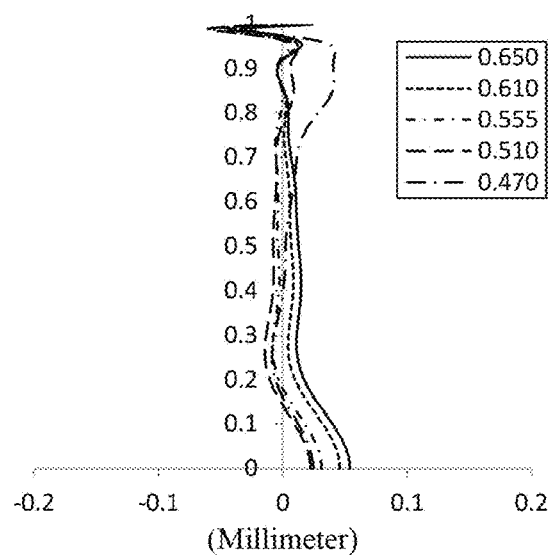
FIGS. 12A to 12C illustrate a longitudinal aberration curve, an astigmatic curve and a distortion curve of the optical imaging lens assembly of the example 6, respectively.
Figure 12B:
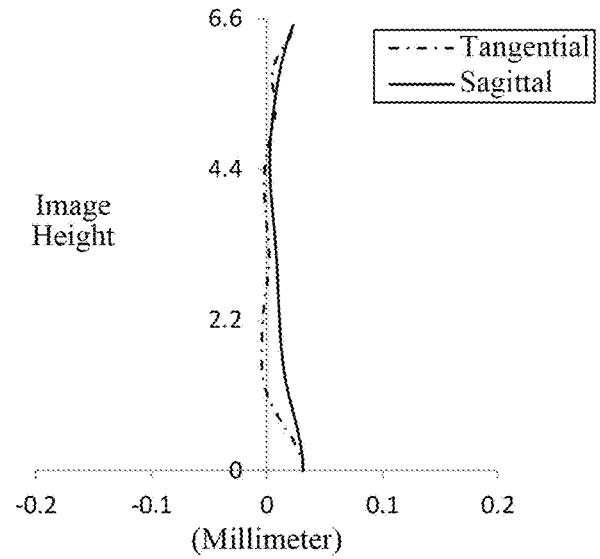
Figure 12C:
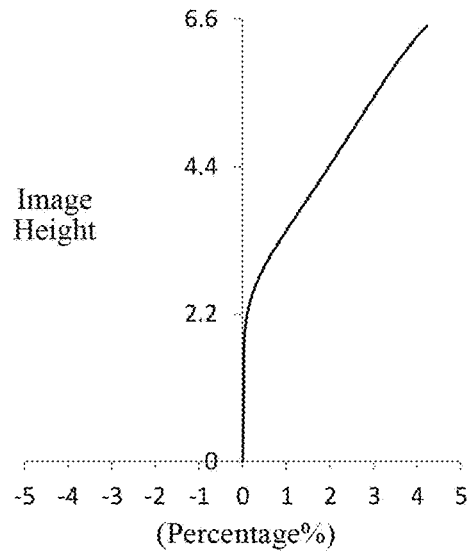

FIG. 12A illustrates a longitudinal aberration curve of the optical imaging lens assembly according to example 6, representing deviations of focal points converged by light of different wavelengths after passing through the lens assembly. FIG. 12B illustrates an astigmatic curve of the optical imaging lens assembly according to example 6, representing a curvature of a tangential plane and a curvature of a sagittal plane. FIG. 12C illustrates a distortion curve of the optical imaging lens assembly according to example 6, representing amounts of distortion corresponding to different image heights. It can be seen from FIG. 12A to FIG. 12C that the optical imaging lens assembly provided in example 6 may achieve good image quality.

Example 7

Figure 13:
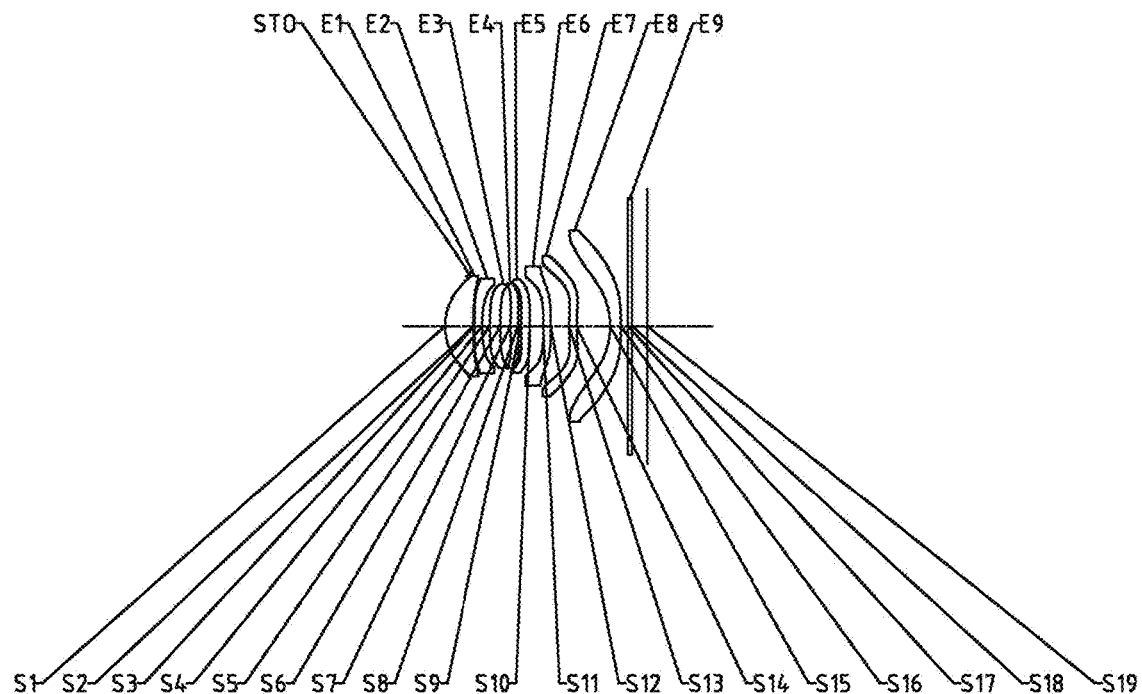
FIG. 13 illustrates a schematic structural view of an optical imaging lens assembly according to example 7 of the present disclosure.

An optical imaging lens assembly according to example 7 of the present disclosure is described below with reference to FIG. 13 to FIG. 14C. FIG. 13 shows a schematic structural view of the optical imaging lens assembly according to example 7 of the present disclosure.

As shown in FIG. 13, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 thereof is a concave surface. The eighth lens E8 has negative refractive power, an object-side surface S15 thereof is a concave surface, and an image-side surface S16 thereof is a convex surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly is 9.07 mm, a total length TTL of the optical imaging lens assembly is 8.80 mm, half of a diagonal length ImgH of an effective pixel area on the imaging plane S19 of the optical imaging lens assembly is 6.00 mm, half of a maximal field-of-view Semi-FOV of the optical imaging lens assembly is 32.6°, and an aperture value Fno of the optical imaging lens assembly is 2.05.

Table 13 is a table illustrating basic parameters of the optical imaging lens assembly of example 7, wherein the units for the radius of curvature, the thickness/distance and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −1.1232 | | | | |
| S1 | Aspheric | 2.6347 | 1.2469 | 1.55 | 56.1 | 5.69 | 0.0390 |
| S2 | Aspheric | 14.4604 | 0.0500 | | | | 16.3583 |
| S3 | Aspheric | 24.7870 | 0.3309 | 1.68 | 19.2 | −11.24 | 15.9027 |
| S4 | Aspheric | 5.7958 | 0.3314 | | | | 1.1060 |
| S5 | Aspheric | 8.5451 | 0.4551 | 1.55 | 56.1 | 128.17 | 16.3938 |
| S6 | Aspheric | 9.5507 | 0.4421 | | | | 16.5940 |
| S7 | Aspheric | 10.6165 | 0.3303 | 1.57 | 37.4 | −112.94 | 1.5094 |
| S8 | Aspheric | 9.0162 | 0.1368 | | | | −2.0223 |
| S9 | Aspheric | 14.2623 | 0.3825 | 1.68 | 19.2 | 66.69 | −16.3787 |
| S10 | Aspheric | 20.6142 | 0.5723 | | | | −31.5186 |
| S11 | Aspheric | 23.0259 | 0.3300 | 1.57 | 37.4 | 73.84 | −57.5067 |
| S12 | Aspheric | 50.2895 | 0.7944 | | | | 33.5098 |
| S13 | Aspheric | 6.3073 | 0.3300 | 1.55 | 56.1 | 4337.47 | −0.4919 |
| S14 | Aspheric | 6.2073 | 1.4525 | | | | −23.3411 |
| S15 | Aspheric | −3.7633 | 0.4719 | 1.54 | 55.9 | −8.59 | −1.0141 |
| S16 | Aspheric | −21.3507 | 0.2997 | | | | −51.0243 |
| S17 | Spherical | Infinite | 0.1938 | 1.52 | 64.2 | | |
| S18 | Spherical | Infinite | 0.6556 | | | | |
| S19 | Spherical | Infinite | | | | | |

TABLE 14

| Surface number | A4 | A6 | A8 | A10 | A12 | A14 | A16 | A18 | A20 |
|---|---|---|---|---|---|---|---|---|---|
| S1 | 2.4962E−04 | −1.6020E−03 | 1.9611E−03 | −1.3430E−03 | 5.1560E−04 | −1.0582E−04 | 8.1704E−06 | 5.5464E−07 | −1.0130E−07 |
| S2 | −1.3348E−02 | 2.5075E−02 | −2.5682E−02 | 1.7048E−02 | −6.8049E−03 | 1.5858E−03 | −2.0195E−04 | 1.1597E−05 | −1.3599E−07 |
| S3 | −1.1221E−02 | 2.6029E−02 | −2.5385E−02 | 1.6976E−02 | −6.9699E−03 | 1.7199E−03 | −2.4602E−04 | 1.8554E−05 | −5.6082E−07 |
| S4 | −2.5221E−03 | 1.4923E−02 | −2.0056E−02 | 2.3564E−02 | −1.7188E−02 | 7.9924E−03 | −2.2646E−03 | 3.5295E−04 | −2.3056E−05 |
| S5 | −1.0636E−02 | 2.6098E−03 | −3.6053E−05 | 3.6423E−03 | −3.4813E−03 | 1.8511E−03 | −5.6794E−04 | 9.0765E−05 | −5.7292E−06 |
| S6 | −1.1157E−02 | −3.2306E−03 | 1.3014E−02 | −1.5908E−02 | 1.4687E−02 | −8.5640E−03 | 3.0125E−03 | −5.8355E−04 | 4.8024E−05 |
| S7 | −1.6976E−02 | −1.7473E−02 | 1.4695E−02 | −8.5812E−03 | 4.4755E−03 | −1.6962E−03 | 3.8712E−04 | −4.4474E−05 | 1.4250E−06 |
| S8 | −1.8083E−02 | −1.2325E−02 | 3.8023E−03 | −1.9518E−03 | 3.4843E−03 | −2.6611E−03 | 9.8178E−04 | −1.8222E−04 | 1.3468E−05 |
| S9 | −2.9597E−02 | −2.5635E−04 | 1.1378E−02 | −2.2048E−02 | 2.0669E−02 | −1.1051E−02 | 3.4184E−03 | −5.7320E−04 | 4.0292E−05 |
| S10 | −3.8502E−02 | 1.1240E−02 | −5.4911E−03 | 1.3845E−03 | 3.2973E−04 | −4.7628E−04 | 1.7979E−04 | −3.1308E−05 | 2.1828E−06 |
| S11 | −4.2264E−02 | 1.3960E−03 | 1.8719E−03 | −3.6505E−03 | 2.8666E−03 | −1.2242E−03 | 2.9116E−04 | −3.6375E−05 | 1.8829E−06 |
| S12 | −3.5344E−02 | 5.8208E−03 | −3.1580E−03 | 1.8870E−03 | −6.3307E−04 | 1.2603E−04 | −1.4408E−05 | 8.5227E−07 | −1.9703E−08 |
| S13 | −3.9736E−02 | −9.9372E−03 | 6.7439E−03 | −2.7367E−03 | 7.5474E−04 | −1.3127E−04 | 1.3743E−05 | −7.8070E−07 | 1.8165E−08 |
| S14 | −1.6430E−02 | −1.3651E−02 | 7.0667E−03 | −2.2024E−03 | 4.5429E−04 | −5.8927E−05 | 4.6234E−06 | −2.0295E−07 | 3.8736E−09 |
| S15 | −9.0116E−03 | 6.5165E−04 | −2.1332E−04 | 1.0496E−04 | −1.8116E−05 | 1.5826E−06 | −7.7507E−08 | 2.0679E−09 | −2.3791E−11 |
| S16 | −1.6803E−02 | 1.6354E−03 | −2.6090E−04 | 7.6140E−05 | −1.3468E−05 | 1.3178E−06 | −7.2893E−08 | 2.1445E−09 | −2.6018E−11 |

Figure 14A:
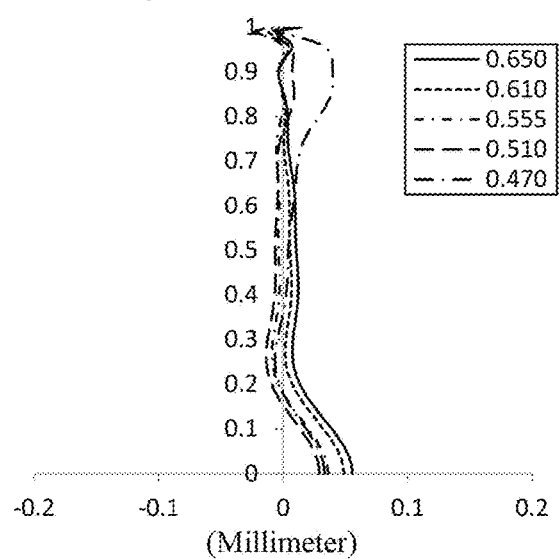
FIGS. 14A to 14C illustrate a longitudinal aberration curve, an astigmatic curve and a distortion curve of the optical imaging lens assembly of the example 7, respectively.
Figure 14B:
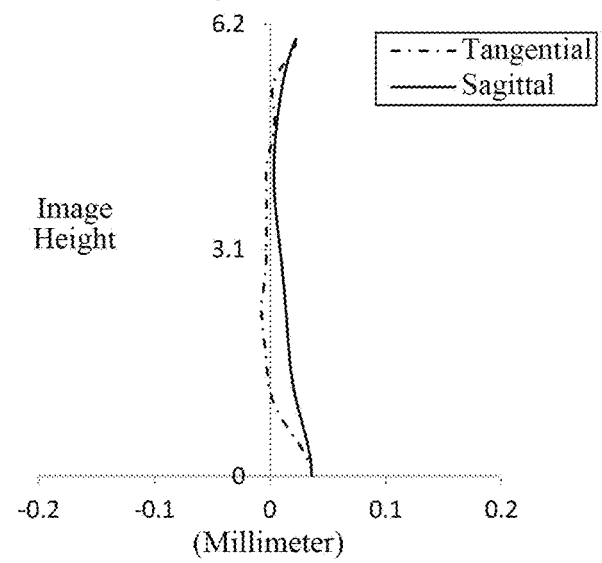
Figure 14C:
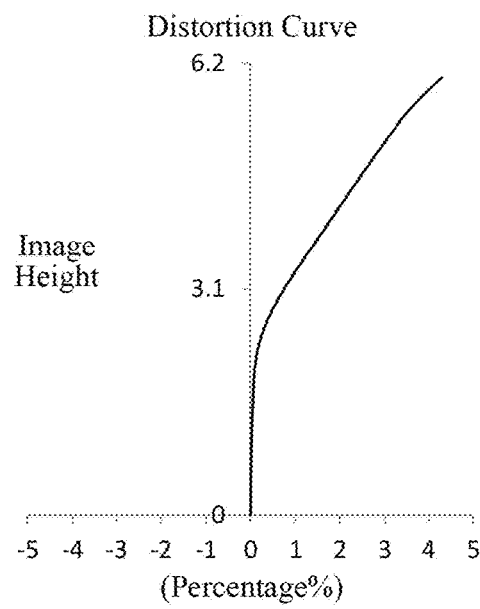

FIG. 14A illustrates a longitudinal aberration curve of the optical imaging lens assembly according to example 7, representing deviations of focal points converged by light of different wavelengths after passing through the lens assembly. FIG. 14B illustrates an astigmatic curve of the optical imaging lens assembly according to example 7, representing a curvature of a tangential plane and a curvature of a sagittal plane. FIG. 14C illustrates a distortion curve of the optical imaging lens assembly according to example 7, representing amounts of distortion corresponding to different image heights. It can be seen from FIG. 14A to FIG. 14C that the optical imaging lens assembly provided in example 7 may achieve good image quality.

Example 8

Figure 15:
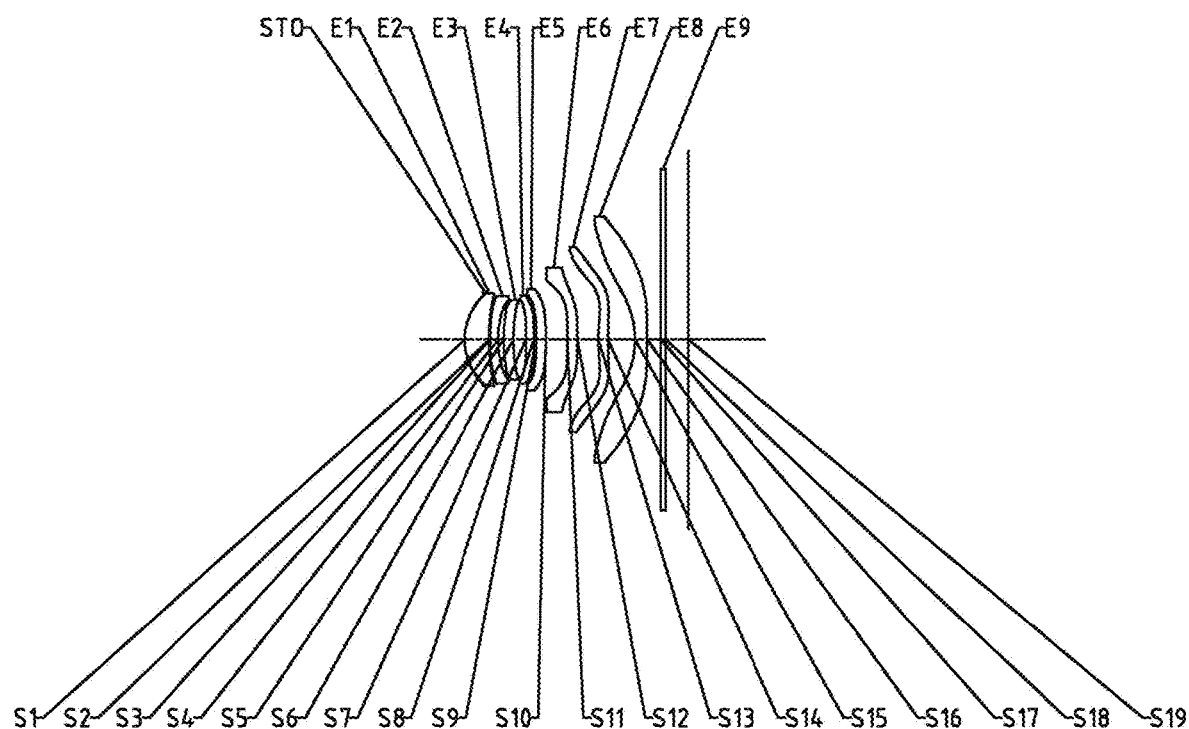
FIG. 15 illustrates a schematic structural view of an optical imaging lens assembly according to example 8 of the present disclosure.

An optical imaging lens assembly according to example 8 of the present disclosure is described below with reference to FIG. 15 to FIG. 16C. FIG. 15 shows a schematic structural view of the optical imaging lens assembly according to example 8 of the present disclosure.

As shown in FIG. 15, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a convex surface. The fifth lens E5 has positive refractive power, an object-side surface S9 thereof is a concave surface, and an image-side surface S10 thereof is a convex surface. The sixth lens E6 has positive refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 thereof is a concave surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly is 9.40 mm, a total length TTL of the optical imaging lens assembly is 9.30 mm, half of a diagonal length ImgH of an effective pixel area on the imaging plane S19 of the optical imaging lens assembly is 7.93 mm, half of a maximal field-of-view Semi-FOV of the optical imaging lens assembly is 39.1°, and an aperture value Fno of the optical imaging lens assembly is 2.40.

Table 15 is a table illustrating basic parameters of the optical imaging lens assembly of example 8, wherein the units for the radius of curvature, the thickness/distance and the focal length are millimeter (mm). Table 16 shows high-order coefficients applicable to each aspheric surface in example 8, wherein the surface shape of each aspheric surface may be defined by the formula (1) given in the above example 1.

TABLE 15

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.8711 | | | | |
| S1 | Aspheric | 2.6366 | 1.0138 | 1.55 | 56.1 | 6.30 | 0.0423 |
| S2 | Aspheric | 9.7619 | 0.0500 | | | | 5.7434 |
| S3 | Aspheric | 11.2552 | 0.3300 | 1.68 | 19.2 | −14.34 | 17.2753 |
| S4 | Aspheric | 5.1534 | 0.2333 | | | | 3.5320 |
| S5 | Aspheric | 8.3525 | 0.4052 | 1.55 | 56.1 | 199.99 | 18.7125 |
| S6 | Aspheric | 8.8894 | 0.5186 | | | | 22.7351 |
| S7 | Aspheric | −87.7590 | 0.3300 | 1.57 | 37.4 | −211.74 | 50.0000 |
| S8 | Aspheric | −318.1162 | 0.0916 | | | | 50.0000 |
| S9 | Aspheric | −234.0358 | 0.4026 | 1.68 | 19.2 | 191.60 | 50.0000 |
| S10 | Aspheric | −83.5585 | 0.8976 | | | | −99.0000 |
| S11 | Aspheric | 27.5068 | 0.4108 | 1.57 | 37.4 | 61.28 | −39.2602 |
| S12 | Aspheric | 126.5824 | 0.8766 | | | | −99.0000 |
| S13 | Aspheric | 7.7252 | 0.4000 | 1.55 | 56.1 | 21.92 | 1.5189 |
| S14 | Aspheric | 21.3889 | 1.1225 | | | | 23.1632 |
| S15 | Aspheric | −4.0120 | 0.5000 | 1.54 | 55.9 | −6.89 | −1.1712 |
| S16 | Aspheric | 49.6883 | 0.5652 | | | | 40.5271 |
| S17 | Spherical | Infinite | 0.2100 | 1.52 | 64.2 | | |
| S18 | Spherical | Infinite | 0.9482 | | | | |
| S19 | Spherical | Infinite | | | | | |

TABLE 16

| Surface number | A4 | A6 | A8 | A10 | A12 | A14 | A16 | A18 | A20 |
|---|---|---|---|---|---|---|---|---|---|
| S1 | 5.0232E−04 | −1.2366E−03 | 1.6329E−03 | −1.2109E−03 | 5.3394E−04 | −1.3848E−04 | 1.9070E−05 | −9.4684E−07 | −3.0117E−08 |
| S2 | −1.0480E−02 | 1.4196E−02 | −1.2508E−02 | 8.6658E−03 | −4.3036E−03 | 1.5136E−03 | −3.6232E−04 | 5.2694E−05 | −3.4524E−06 |
| S3 | −6.2436E−03 | 1.5157E−02 | −1.2606E−02 | 7.9349E−03 | −3.5459E−03 | 1.1691E−03 | −2.8472E−04 | 4.5026E−05 | −3.2520E−06 |
| S4 | 1.1326E−03 | 9.1954E−03 | −9.8203E−03 | 1.0644E−02 | −8.0296E−03 | 4.2278E−03 | −1.3799E−03 | 2.4369E−04 | −1.7492E−05 |
| S5 | −1.0125E−02 | 3.6623E−03 | 5.3223E−04 | −1.2835E−03 | 5.4017E−05 | 2.2334E−04 | −1.4326E−04 | 2.9338E−05 | −1.9416E−06 |
| S6 | −1.0597E−02 | 3.7202E−03 | −2.9239E−03 | 4.3183E−03 | −3.1949E−03 | 1.5480E−03 | −4.5211E−04 | 7.1615E−05 | −4.6773E−06 |
| S7 | −1.3497E−02 | −1.2035E−02 | 9.7001E−03 | −8.5117E−03 | 5.7832E−03 | −2.7083E−03 | 8.5460E−04 | −1.6174E−04 | 1.3380E−05 |
| S8 | −1.9380E−02 | −2.2559E−03 | −2.1222E−03 | −1.5657E−04 | 1.3353E−03 | −6.7107E−04 | 1.5713E−04 | −2.1031E−05 | 1.2475E−06 |
| S9 | −3.1974E−02 | 9.4758E−03 | −3.2463E−03 | −3.3997E−03 | 4.2521E−03 | −2.0050E−03 | 4.9425E−04 | −6.4756E−05 | 3.5656E−06 |
| S10 | −3.0671E−02 | 1.0253E−02 | −6.2313E−03 | 3.0591E−03 | −1.1751E−03 | 3.3146E−04 | −6.5282E−05 | 7.7321E−06 | −3.9001E−07 |
| S11 | −3.0881E−02 | 2.4296E−03 | 1.2885E−03 | −1.6162E−03 | 6.7100E−04 | −1.5067E−04 | 1.9689E−05 | −1.4473E−06 | 4.8780E−08 |
| S12 | −2.9877E−02 | 3.2587E−03 | 1.1662E−03 | −1.0344E−03 | 3.4167E−04 | −5.8766E−05 | 5.6070E−06 | −2.8375E−07 | 5.9857E−09 |
| S13 | −3.5330E−03 | −1.3695E−02 | 4.7592E−03 | −1.0436E−03 | 1.5083E−04 | −1.3626E−05 | 7.3807E−07 | −2.2018E−08 | 2.7930E−10 |
| S14 | 1.4964E−02 | −1.7040E−02 | 5.2323E−03 | −1.0439E−03 | 1.4028E−04 | −1.2165E−05 | 6.4471E−07 | −1.8901E−08 | 2.3425E−10 |
| S15 | −8.5902E−04 | −1.6133E−03 | 5.2294E−04 | −6.4517E−05 | 4.4842E−06 | −1.9380E−07 | 5.2184E−09 | −8.0643E−11 | 5.4728E−13 |
| S16 | −1.3049E−02 | 1.1876E−03 | −4.9330E−05 | −3.1014E−07 | 4.7500E−08 | 5.5739E−09 | −5.1119E−10 | 1.4869E−11 | −1.5062E−13 |

Figure 16A:
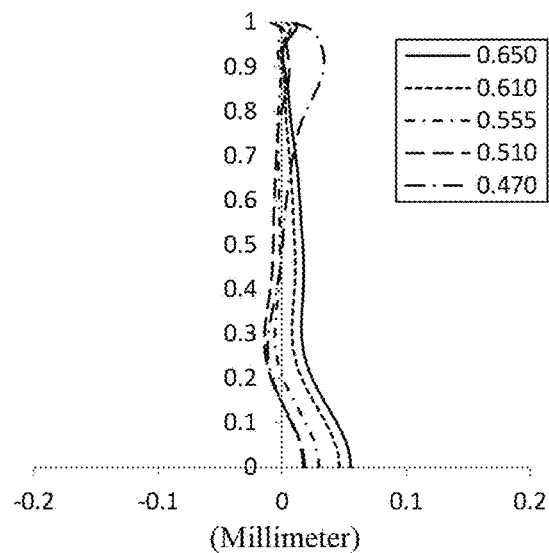
FIGS. 16A to 16C illustrate a longitudinal aberration curve, an astigmatic curve and a distortion curve of the optical imaging lens assembly of the example 8, respectively.
Figure 16B:
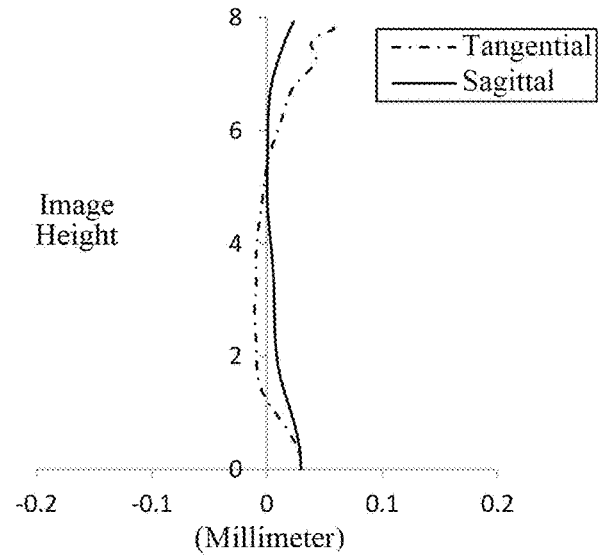
Figure 16C:
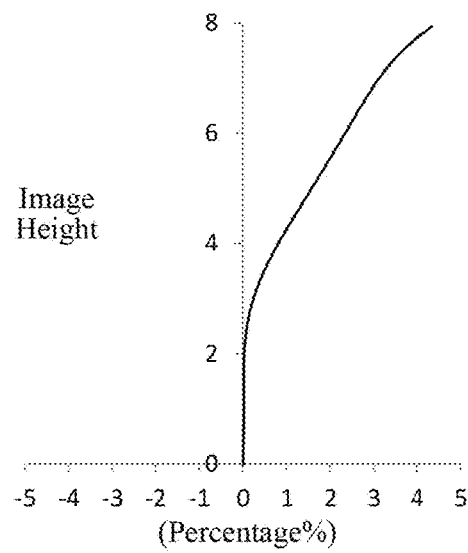

FIG. 16A illustrates a longitudinal aberration curve of the optical imaging lens assembly according to example 8, representing deviations of focal points converged by light of different wavelengths after passing through the lens assembly. FIG. 16B illustrates an astigmatic curve of the optical imaging lens assembly according to example 8, representing a curvature of a tangential plane and a curvature of a sagittal plane. FIG. 16C illustrates a distortion curve of the optical imaging lens assembly according to example 8, representing amounts of distortion corresponding to different image heights. It can be seen from FIG. 16A to FIG. 16C that the optical imaging lens assembly provided in example 8 may achieve good image quality.

In view of the above, examples 1 to 8 respectively satisfy the relationship shown in Table 17.

TABLE 17

| Conditional/Example | 1 | 2 | 3 | 4 | 5 | 6 | 7 | 8 |
|---|---|---|---|---|---|---|---|---|
| TTL/ImgH | 1.28 | 1.21 | 1.17 | 1.20 | 1.27 | 1.45 | 1.47 | 1.17 |
| TTL/f | 0.99 | 1.00 | 0.99 | 0.99 | 0.98 | 0.97 | 0.97 | 0.99 |
| f6/(f2 + f8) | −2.99 | −2.62 | −2.82 | −2.57 | −2.59 | −2.88 | −3.72 | −2.89 |
| f/f1 | 1.56 | 1.50 | 1.44 | 1.50 | 1.56 | 1.56 | 1.59 | 1.49 |
| (R1 + R2)/(R1 − R2) | −1.47 | −1.61 | −1.80 | −1.63 | −1.53 | −1.48 | −1.45 | −1.74 |
| R3/R4 | 2.92 | 2.65 | 2.10 | 2.51 | 2.96 | 3.87 | 4.28 | 2.18 |
| (R5 + R6)/f | 2.14 | 2.15 | 2.00 | 2.11 | 2.18 | 2.04 | 2.00 | 1.83 |
| T34/(CT4 − T45) | 2.63 | 2.57 | 2.36 | 2.67 | 2.18 | 2.55 | 2.28 | 2.18 |
| CT5/T56 | 0.49 | 0.53 | 0.48 | 0.52 | 0.46 | 0.61 | 0.67 | 0.45 |
| (T67 + T78)/(CT7 + CT8) | 2.27 | 2.65 | 2.35 | 3.15 | 2.80 | 3.02 | 2.80 | 2.22 |
| T78/(T12 + T23 + T34 + T45) | 1.07 | 1.23 | 1.24 | 1.32 | 1.03 | 1.44 | 1.51 | 1.26 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, comprising: a first lens, a second lens, a third lens, a fourth lens, a fifth lens, a sixth lens, a seventh lens and an eighth lens, which are sequentially arranged from an object side to an image side of the optical imaging lens assembly along an optical axis, wherein,
each of the first lens to the eighth lens has refractive power,
at least one of the first lens to the eighth lens has an aspheric surface,
wherein TTL/f≤1.0,
ImgH≥6.0 mm,
1.0<TTL/ImgH<1.5, and
−4.0<f6/(f2+f8)<−2.5 where TTL is a distance along the optical axis from an object-side surface of the first lens to an imaging plane of the optical imaging lens assembly, f is a total effective focal length of the optical imaging lens assembly, ImgH is half of a diagonal length of an effective pixel area on the imaging plane of the optical imaging lens assembly, f2 is an effective focal length of the second lens, f6 is an effective focal length of the sixth lens, and f8 is an effective focal length of the eighth lens.

2. The optical imaging lens assembly according to claim 1, wherein $1.0<f/f1<2.0$,
where f is the total effective focal length of the optical imaging lens assembly, and f1 is an effective focal length of the first lens.

3. The optical imaging lens assembly according to claim 1, wherein $-2.0<(R1+R2)/(R1-R2)<-1.0$,
where R1 is a radius of curvature of the object-side surface of the first lens, and R2 is a radius of curvature of an image-side surface of the first lens.

4. The optical imaging lens assembly according to claim 1, wherein $2.0<R3/R4<4.5$,
where R3 is a radius of curvature of an object-side surface of the second lens, and R4 is a radius of curvature of an image-side surface of the second lens.

5. The optical imaging lens assembly according to claim 1, wherein $1.5<(R5+R6)/f<2.5$,
where R5 is a radius of curvature of an object-side surface of the third lens, R6 is a radius of curvature of an image-side surface of the third lens, and f is the total effective focal length of the optical imaging lens assembly.

6. The optical imaging lens assembly according to claim 1, wherein $2.0<T34/(CT4-T45)<3.0$,
where T34 is a spaced interval between the third lens and the fourth lens along the optical axis, CT4 is a center thickness of the fourth lens along the optical axis, and T45 is a spaced interval between the fourth lens and the fifth lens along the optical axis.

7. The optical imaging lens assembly according to claim 1, wherein $0<CT5/T56<1.0$,
where CT5 is a center thickness of the fifth lens along the optical axis, and T56 is a spaced interval between the fifth lens and the sixth lens along the optical axis.

8. The optical imaging lens assembly according to claim 1, wherein $2.0<(T67+T78)/(CT7+CT8)<3.5$,
where T67 is a spaced interval between the sixth lens and the seventh lens along the optical axis, T78 is a spaced interval between the seventh lens and the eighth lens along the optical axis, CT7 is a center thickness of the seventh lens along the optical axis, and CT8 is a center thickness of the eighth lens along the optical axis.

9. The optical imaging lens assembly according to claim 1, wherein $1.0<T78/(T12+T23+T34+T45)<2.0$,
where T12 is a spaced interval between the first lens and the second lens along the optical axis, T23 is a spaced interval between the second lens and the third lens along the optical axis, T34 is a spaced interval between the third lens and the fourth lens along the optical axis, T45 is a spaced interval between the fourth lens and the fifth lens along the optical axis, and T78 is a spaced interval between the seventh lens and the eighth lens along the optical axis.

10. An optical imaging lens assembly, comprising: a first lens, a second lens, a third lens, a fourth lens, a fifth lens, a sixth lens, a seventh lens and an eighth lens, which are sequentially arranged from an object side to an image side of the optical imaging lens assembly along an optical axis, wherein,
each of the first lens to the eighth lens has refractive power,
at least one of the first lens to the eighth lens has an aspheric surface,
wherein $--4.0<f6/(f2+f8)<-2.5$, and $1.5<(R5+R6)/f<2.5$,
where f2 is an effective focal length of the second lens, f6 is an effective focal length of the sixth lens, f8 is an effective focal length of the eighth lens, R5 is a radius of curvature of an object-side surface of the third lens, R6 is a radius of curvature of an image-side surface of the third lens, and f is a total effective focal length of the optical imaging lens assembly, and
wherein $2.0<(T67+T78)/(CT7+CT8)<3.5$,
where T67 is a spaced interval between the sixth lens and the seventh lens along the optical axis, T78 is a spaced interval between the seventh lens and the eighth lens along the optical axis, CT7 is a center thickness of the seventh lens along the optical axis, and CT8 is a center thickness of the eighth lens along the optical axis.

11. The optical imaging lens assembly according to claim 10, wherein $1.0<f/f1<2.0$,
where f is a total effective focal length of the optical imaging lens assembly, and f1 is an effective focal length of the first lens.

12. The optical imaging lens assembly according to claim 10, wherein $-2.0<(R1+R2)/(R1-R2)<-1.0$,
where R1 is a radius of curvature of an object-side surface of the first lens, and R2 is a radius of curvature of an image-side surface of the first lens.

13. The optical imaging lens assembly according to claim 10, wherein $2.0<R3/R4<4.5$,
where R3 is a radius of curvature of an object-side surface of the second lens, and R4 is a radius of curvature of an image-side surface of the second lens.

14. The optical imaging lens assembly according to claim 10, wherein $2.0<T34/(CT4-T45)<3.0$,
where T34 is a spaced interval between the third lens and the fourth lens along the optical axis, CT4 is a center thickness of the fourth lens along the optical axis, and T45 is a spaced interval between the fourth lens and the fifth lens along the optical axis.

15. The optical imaging lens assembly according to claim 10, wherein $0<CT5/T56<1.0$,
where CT5 is a center thickness of the fifth lens along the optical axis, and T56 is a spaced interval between the fifth lens and the sixth lens along the optical axis.

16. The optical imaging lens assembly according to claim 10, wherein $1.0<T78/(T12+T23+T34+T45)<2.0$,
where T12 is a spaced interval between the first lens and the second lens along the optical axis, T23 is a spaced interval between the second lens and the third lens along the optical axis, T34 is a spaced interval between the third lens and the fourth lens along the optical axis, T45 is a spaced interval between the fourth lens and the fifth lens along the optical axis, and T78 is a spaced interval between the seventh lens and the eighth lens along the optical axis.

17. The optical imaging lens assembly according to claim 10, wherein $ImgH \geq 6.0$ mm,
where ImgH is half of a diagonal length of an effective pixel area on an imaging plane of the optical imaging lens assembly.

* * * * *